US010282902B1

(12) United States Patent
Mishra et al.

(10) Patent No.: US 10,282,902 B1
(45) Date of Patent: May 7, 2019

(54) REAL-TIME TEXTURED 3D MODELS

(71) Applicant: Amazon Technologies, Inc., Seattle, WA (US)

(72) Inventors: Pragyana K. Mishra, Seattle, WA (US); Dushyant Goyal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 15/192,577

(22) Filed: Jun. 24, 2016

(51) Int. Cl.
*G06K 9/00* (2006.01)
*G06T 19/00* (2011.01)
*G06T 17/10* (2006.01)
*H04N 13/211* (2018.01)
*H04N 13/00* (2018.01)

(52) U.S. Cl.
CPC ............ *G06T 19/003* (2013.01); *G06T 17/10* (2013.01); *H04N 13/211* (2018.05); *G06T 2200/04* (2013.01); *G06T 2219/2004* (2013.01); *H04N 2013/0081* (2013.01)

(58) Field of Classification Search
CPC ................................................. G06T 2200/04
See application file for complete search history.

(56) References Cited

U.S. PATENT DOCUMENTS

| 2014/0267254 A1* | 9/2014 | Sievert .................... G06T 17/05 345/420 |
| 2017/0228927 A1* | 8/2017 | Sugimura ............... G06T 17/10 |
| 2017/0353707 A1* | 12/2017 | Wang ................... H04N 13/128 |
| 2018/0020207 A1* | 1/2018 | Sugimura .......... H04N 13/0239 |

OTHER PUBLICATIONS

Mishra, P.K., "Image and Depth Coherent Surface Description," Carnegie Mellon University, Robotics Institute, Mar. 2005 (thesis submitted in partial fulfillment of requirements for degree of Doctor of Philosophy).
Mishra, P.K., Amidi, O., Kanade, T., "EigenFairing: 3D Model Fairing using Image Coherence." Carnegie Mellon University, Robotics Institute (2004).

* cited by examiner

*Primary Examiner* — Oneal R Mistry
(74) *Attorney, Agent, or Firm* — Athorus, PLLC

(57) ABSTRACT

3D models of objects in motion may be generated using depth imaging data and visual imaging data captured at different times. A 3D model of an object in motion at a first position may be generated at a first time and projected forward to a second position corresponding to a second time. Imaging data captured from the object at the second position at the second time may be compared to the projected-forward 3D model of the object at the second position. Differences between the imaging data and the projected-forward 3D model may be used to modify the 3D model, as necessary, until an accurate and precise 3D representation of the object has been derived.

20 Claims, 16 Drawing Sheets

ORIGINAL 3D MODEL FORMED FROM DEPTH DATA AND/OR TEXTURE DATA CAPTURED AT TIME 1

MODIFY 3D DEPTH MODEL BASED ON
DIFFERENCES IN TEXTURE BETWEEN
SYNTHETIC 3D MODEL FORMED AT
TIME 1 AND TEXTURE DATA
CAPTURED AT TIME 2

REAL-TIME TEXTURED 3D MODELS

BACKGROUND

In many computer applications (e.g., computer vision or computer graphics), three-dimensional (or 3D) physical objects or surfaces thereof are typically described or represented using models such as 3D meshes, which are sometimes called textured meshes or polygon meshes, that represent both shapes and textures of such objects. A textured mesh of an object typically comprises two parts: a 3D representation of the object defined by vertices and/or edges of the object, and polygonal shapes or faces that extend between such vertices and edges and represent a texture of the object. From a purely digital perspective, a textured mesh thus defines both a volume and an appearance of the object in a manner that may be readily utilized in connection with one or more graphical applications.

Forming a 3D model of an object (e.g., a textured mesh) typically requires the use of imaging devices and computer-driven modeling techniques to capture digital imagery of the object and to generate a physical representation of the object. For example, the physical representation of the object may be defined by a set of points in 3D space, which may be obtained from a depth image of the object or other ranging data, or from one or more two-dimensional (or 2D) images of the object, such as by modeling the object using stereo or structure-from-motion (or SFM) algorithms. Using such data, a depth model, such as a point cloud, of the object may be defined for the object, including a set of points that may be described with respect to Cartesian coordinates. Subsequently, a textured mesh or other 3D model may be generated for the object using a visual digital image and the depth model, such as by mapping or patching portions or sectors of the visual digital image to the polygonal shapes defined by the respective points of the depth model.

Generating a depth model of an object from imaging data captured from the object (e.g., a plurality of depth images or other point samples of depths or ranges to an object) is a computationally expensive process, however, that tends to consume or occupy substantial amounts of available data storage, processing and transmission capacities, and may require comparatively lengthy processing times. Moreover, processes by which depth images or other point samples of depth are captured typically do not effectively sample an object's shape at its sharpest points, e.g., corners or edges of the object, regardless of their density. Thus, textured meshes that are generated based on depth images or other point samples typically do not represent corners or edges of objects with sufficient fidelity, and feature meshed surfaces having suboptimal clarity. Effects of such phenomena are exacerbated when an object from which a depth model is desired is in relative motion with respect to an imaging device with which the color image and the depth images are captured. Increasing densities of depth images or other point samples of an object have limited effect in enhancing the accuracy of depth models that are derived therefrom, while greatly increasing the extent of computer resources that are required in order to process such depth images or point samples, or to form a textured mesh therefrom.

DETAILED DESCRIPTION

As is set forth in greater detail below, the present disclosure is directed to generating textured three-dimensional models of objects. More specifically, the systems and methods of the present disclosure may be utilized to generate 3D models (e.g., surface models) based on imaging data captured from an object that is in motion at a known velocity. Using depth data captured by an imaging device with the object in a first position, point clouds or other depth models or depth representations of the object may be derived. Visual images or other texture data that was also captured by the imaging device with the object in the first position may be mapped or patched onto the point clouds or depth representations (e.g., onto polygons such as triangles formed by or between points of such clouds or representations) to form a 3D model or surface model of the object.

Subsequently, the 3D model or surface model of the object may be synthetically projected forward to a second position, and actual visual images or other texture data of the object in the second position may be captured. The actual visual images or texture data captured with the object in the second position may be compared to the synthetic 3D model or synthetic surface model projected to the second position. If textures of the synthetic 3D model or synthetic surface model match the visual images or texture data captured at the second time (e.g., if the textures align with one another, to an acceptable degree or tolerance), then the 3D model or surface model may be deemed to be an accurate representation of the object. If the textures of the synthetic 3D model or synthetic surface model do not match the visual images or texture data captured at the second time, then the 3D model or surface model may be further refined on account of the differences between the synthetic 3D model or synthetic surface model and the visual images or texture data captured at the second time. The synthetic 3D model or synthetic surface model of the object in the second position may be generated from a perspective of the imaging device that captured the depth data and/or visual images or other texture data from which the 3D model or surface model was initially generated, e.g., with the object in the first position, or from a perspective of another imaging device.

Figure 1A:
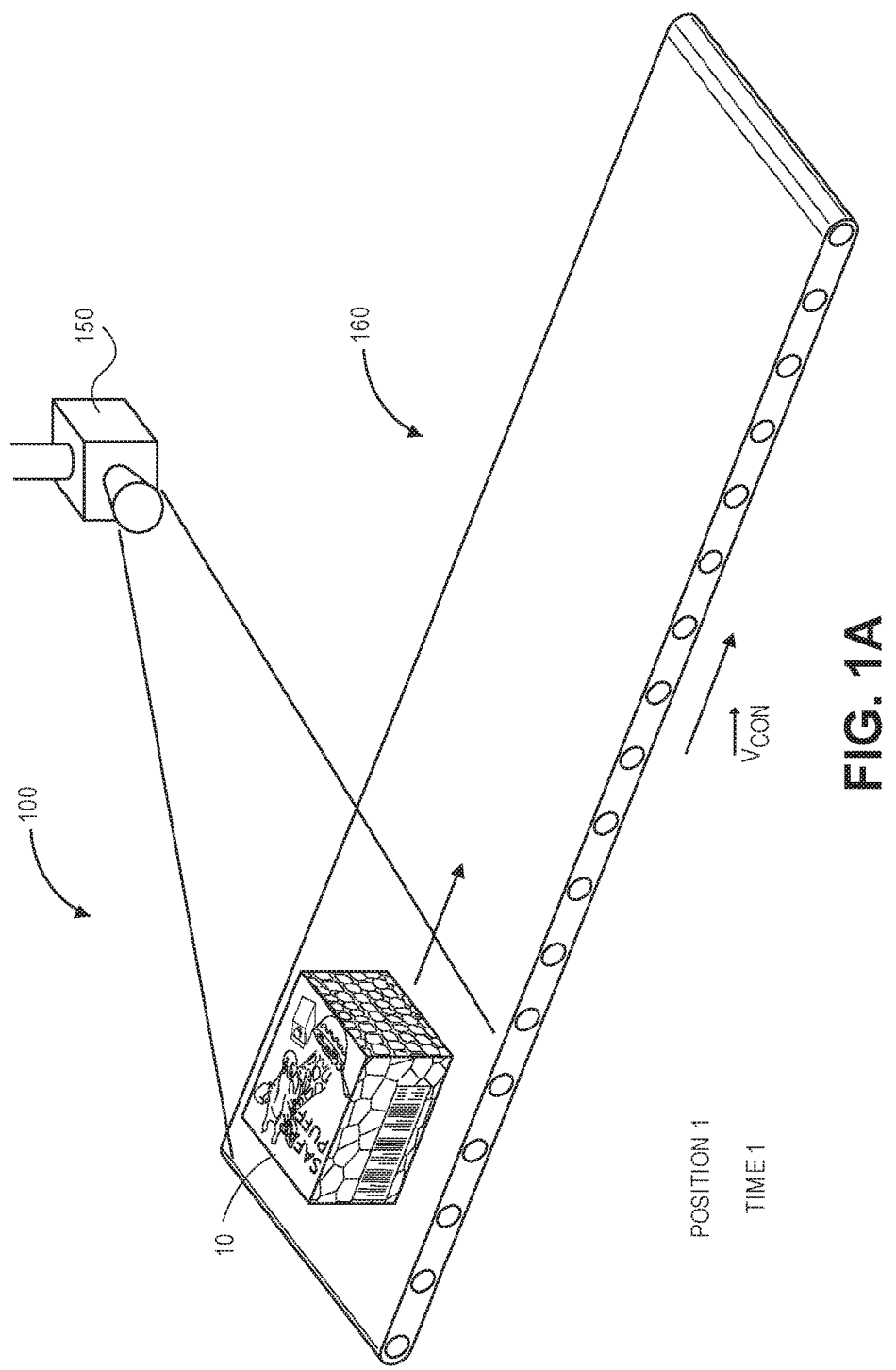
FIG. 1A through FIG. 1F are views of aspects of a system for generating textured three-dimensional models in accordance with embodiments of the present disclosure.

Referring to FIGS. 1A through 1F, a system 100 including an imaging device 150 having a conveyor 160 within a field of view of the imaging device 150 is shown. The conveyor 160 includes an item 10 thereon, and operates to advance the item 10 forward at a velocity $V_{CON}$. As is shown in FIG. 1A, the imaging device 150 is an optical device (such as an RGBz camera, or RGBD camera) that is configured to capture imaging data, including but not limited to depth imaging data and/or visual imaging data regarding item 10 in a first position (viz., position 1) and at a first time (viz., time 1), as the item 10 travels along the conveyor 160. For example, visual imaging data captured using the imaging device 150 may include color imaging data, grayscale imaging data or black-and-white imaging data, while depth imaging data captured using the imaging device 150 may include distances or ranges from a sensor of the imaging device 150 to one or more aspects of the item 10.

Figure 1B:
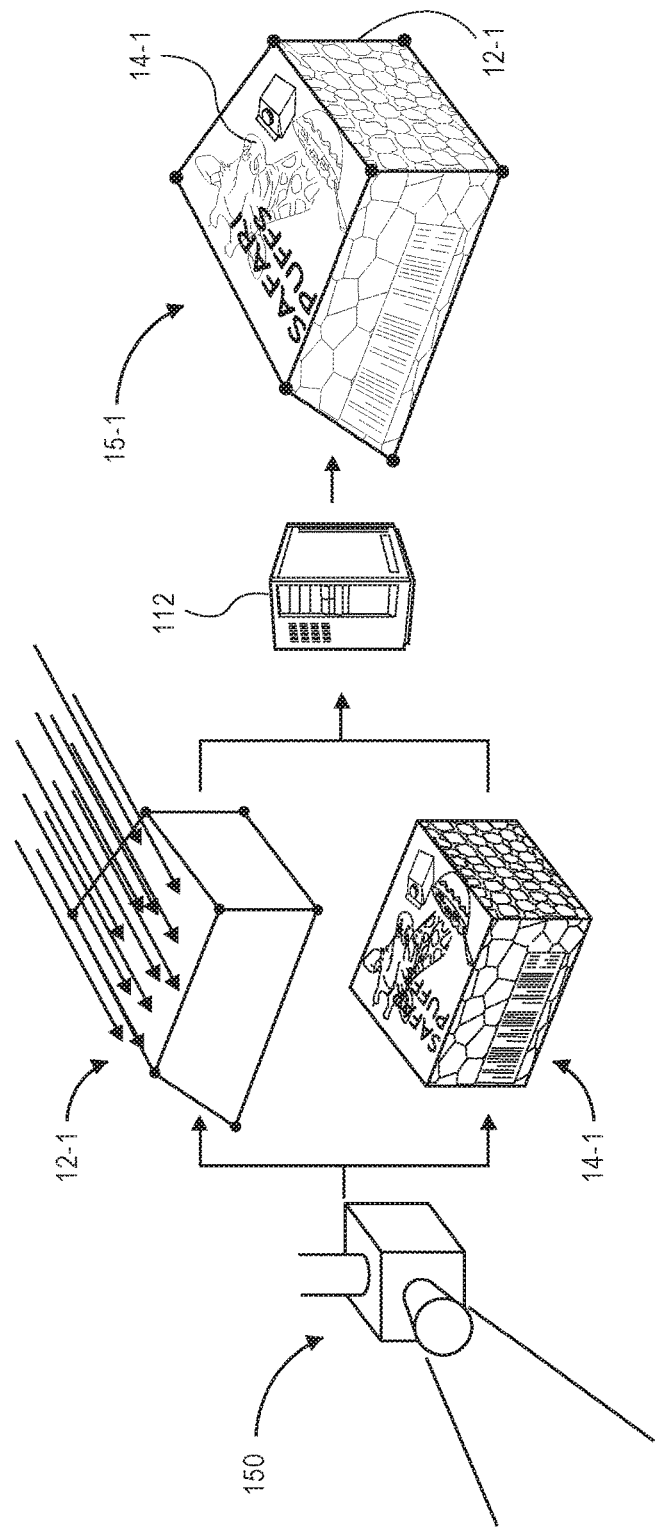
Figure 1C:
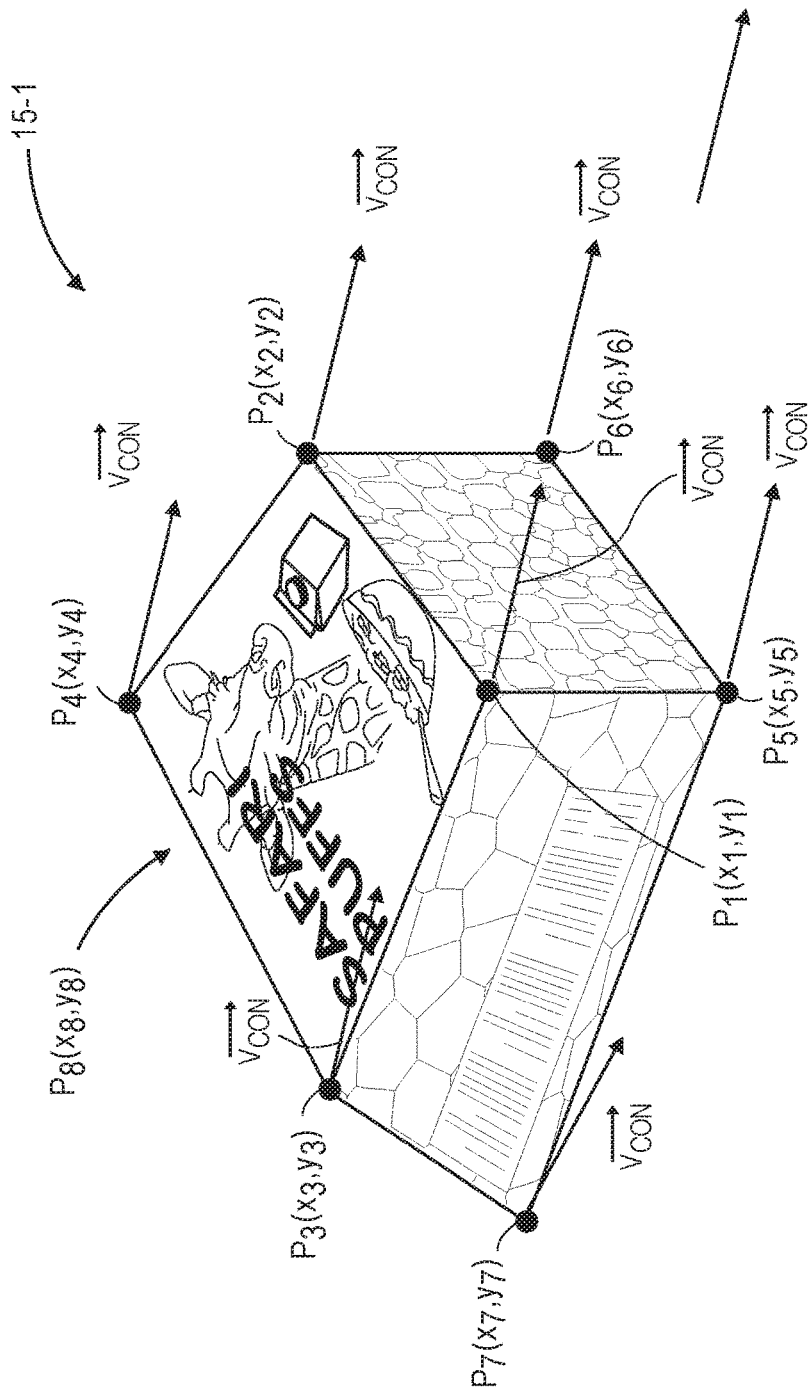

As is shown in FIG. 1B, depth imaging data 12-1 and visual imaging data 14-1 captured with the item 10 in the first position and at the first time is provided to a server 112 for processing. The server 112 may be configured to generate a 3D model 15-1 of the item 10 from the depth imaging data 12-1 and the visual imaging data 14-1. For example, the server 112 may define a point cloud or other depth representation of the item 10 from the depth imaging data 12-1, and may then map or patch portions of visual imaging data 14-1 onto polygons (e.g., triangles) formed by the respective points or other aspects of the point cloud or depth representation. As is shown in FIG. 1C, the 3D model 15-1 is formed from eight points or vertices $P_1(x_1,y_1)$, $P_2(x_2,y_2)$, $P_3(x_3,y_3)$, $P_4(x_4,y_4)$, $P_5(x_5,y_5)$, $P_6(x_6,y_6)$, $P_7(x_7,y_7)$, $P_8(x_8,y_8)$, with respective portions of the imaging data mapped or patched onto the faces defined by the points or vertices.

Because the item 10 is in motion on the conveyor 160, and is traveling at the velocity $V_{CON}$ of the conveyor 160, each of the aspects of the 3D model 15-1 of the item 10 are also presumed to be traveling at the velocity $V_{CON}$ of the conveyor 160. For example, as is also shown in FIG. 1C, where the 3D model 15-1 is formed from eight points or vertices $P_1$, $P_2$, $P_3$, $P_4$, $P_5$, $P_6$, $P_7$, $P_8$, each of such points or vertices is presumed to be traveling at the velocity $V_{CON}$ of the conveyor 160.

Figure 1D:
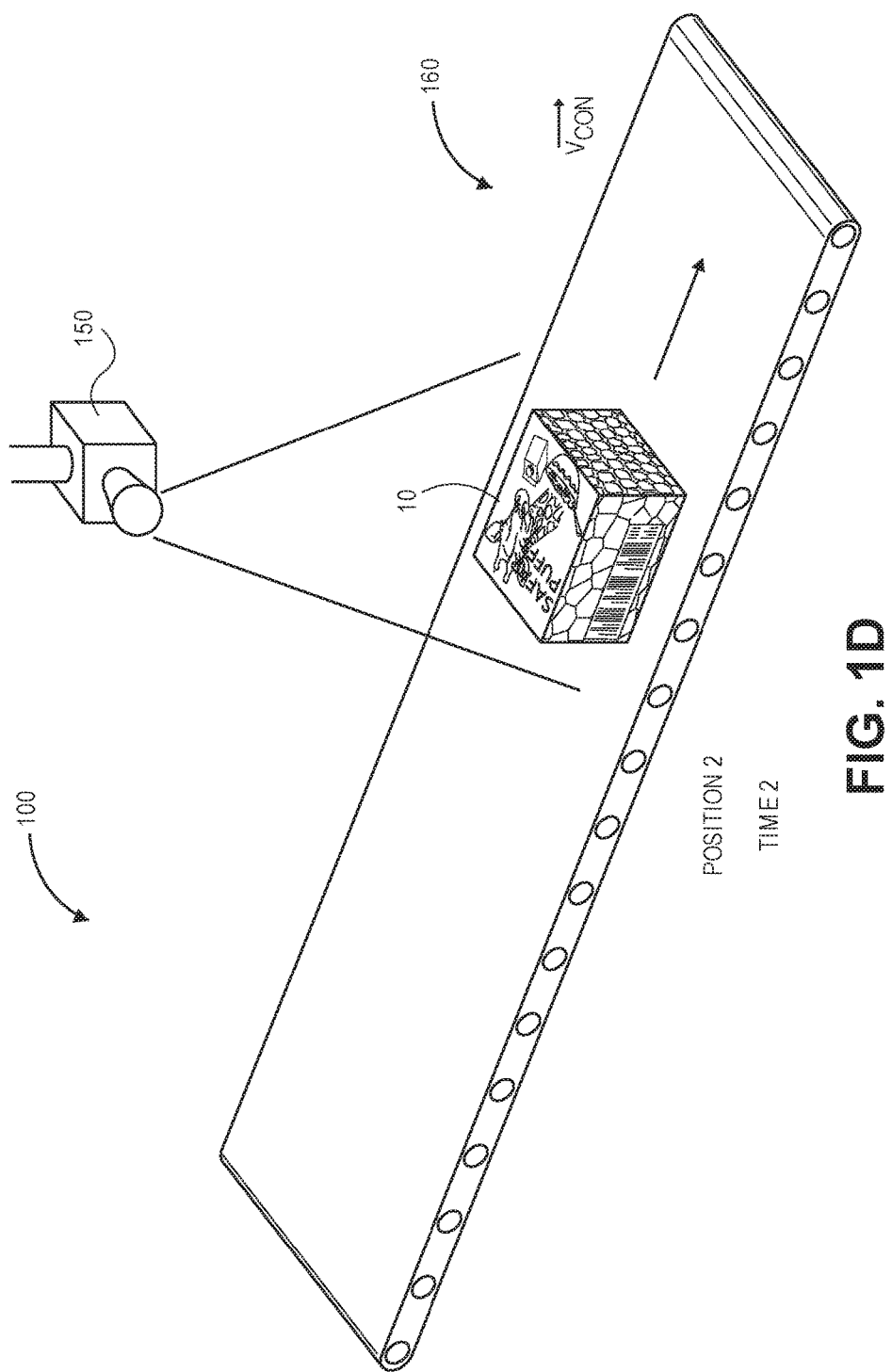
Figure 1E:
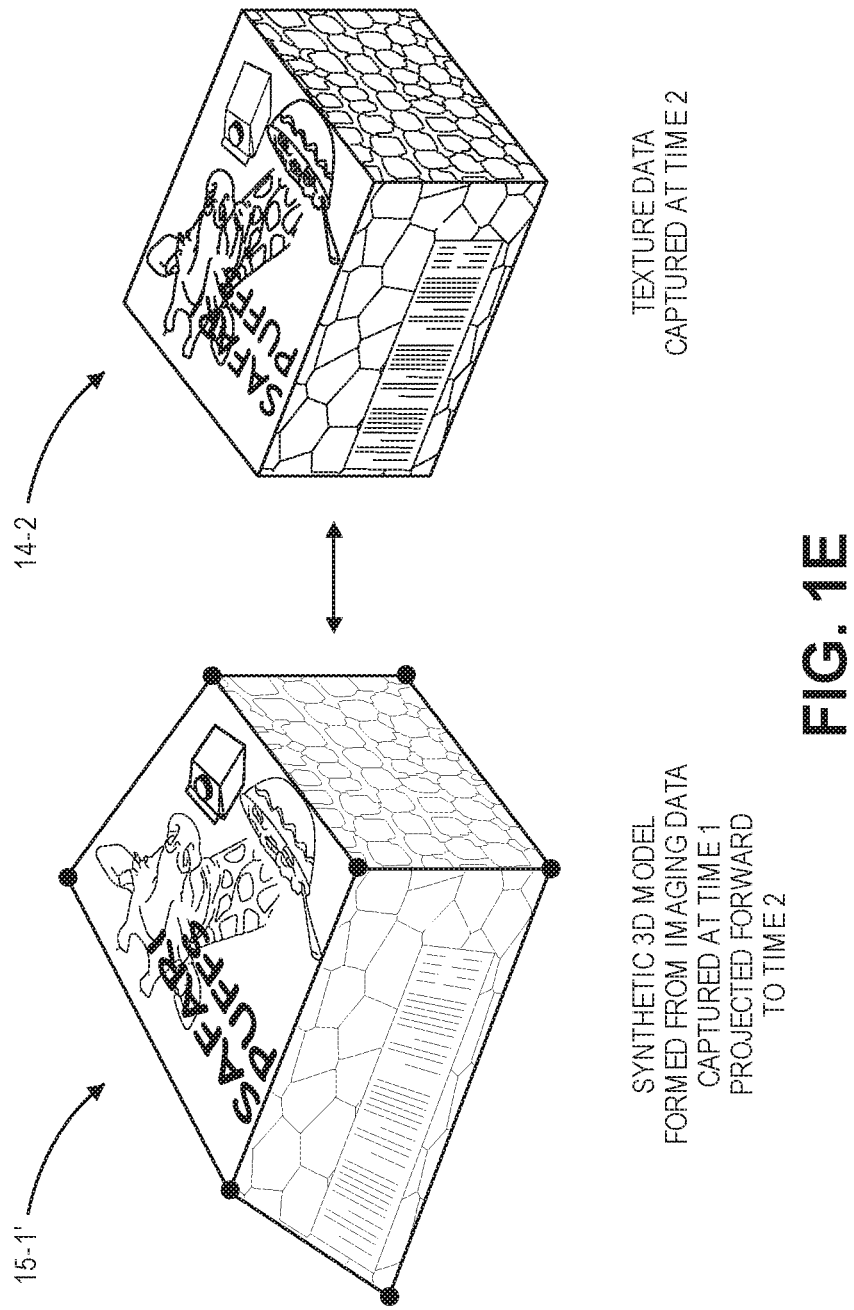

In accordance with the present disclosure, imaging data regarding the item 10 may be continuously captured as the item 10 travels on the conveyor 160 for a predetermined period of time or distance. As is shown in FIG. 1D, the imaging device 150 captures imaging data, e.g., depth imaging data and/or visual imaging data, regarding the item 10 in a second position (viz., position 2) and at a second time (viz., time 2). Additionally, as is discussed above and as shown in FIG. 1E, a synthetic 3D model 15-1' may be defined for a given time (e.g., the second time, or time 2) by projecting the 3D model 15-1 defined from the imaging data captured regarding the item 10 in the first position and at the first time, based on the velocity of the item 10, viz., the velocity $V_{CON}$ of the conveyor 160. The synthetic 3D model 15-1' may thus be compared to visual imaging data 14-2 captured regarding the item 10 at the second time.

In accordance with the present disclosure, the 3D model 15-1 may be updated by determining differences between the textures of the synthetic 3D model 15-1' projected forward to the second time and textures represented in the visual imaging data 14-2 captured at the second time. If the differences between textures of the synthetic 3D model 15-1' and textures of the visual imaging data 14-2 are insubstantial, the 3D model 15-1 is deemed sufficiently representative of the item 10 both in structure and in texture, and no further analysis is required. The 3D model 15-1 may be stored in one or more data stores, and recalled and utilized for any purpose.

Figure 1F:
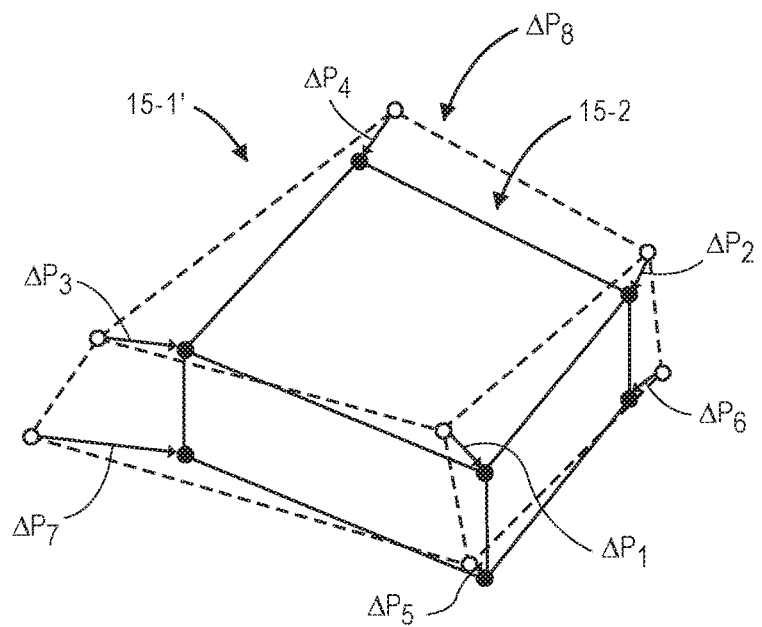

If the differences between the textures of the synthetic 3D model 15-1' and the textures represented in the visual imaging data 14-2 are substantial, however, then the 3D model 15-1 may be adjusted accordingly, e.g., by repositioning one or more of the points, vertices or faces of the 3D model 15-1 based on the content of the visual imaging data 14-2, by adding one or more new points to the 3D model 15-1, or by removing one or more points from the 3D model 15-1. For example, as is shown in FIG. 1F, each of the points or vertices $P_1$, $P_2$, $P_3$, $P_4$, $P_5$, $P_6$, $P_7$, $P_8$ may be adjusted, as necessary, by amounts $\Delta P_1$, $\Delta P_2$, $\Delta P_3$, $\Delta P_4$, $\Delta P_5$, $\Delta P_6$, $\Delta P_7$, $\Delta P_8$ defined by the differences between the synthetic 3D model 15-1' and the visual imaging data 14-2. Thereafter, the 3D model 15-2 may be further refined using visual imaging data captured at a later time (e.g., a third time), if necessary, until the 3D model accurately represents the item 10 both in structure and in texture.

Accordingly, the systems and methods of the present disclosure may be used to form accurate 3D models of objects in motion. An initial 3D model of an object in motion may be generated using visual imaging data and/or depth imaging data captured from the object in a first position. Subsequently, imaging data may be captured from the object in a second position, and compared to a synthetic projection of the initial 3D model from the first position to the second position, e.g., a synthetic 3D model. The synthetic projection may be defined based on reliable assumptions regarding the object, namely, that the object is traveling at a known and constant speed (e.g., an operating speed of the conveyor), and that neither the shape nor the texture of the object varies as the object moves from the first position to the second position. Moreover, the synthetic projection of the initial 3D model of the object in the second position may be defined from a perspective of the imaging device that captured the imaging data from the object in the first position, or from another perspective. For example, where imaging data is captured from the object in the first position using a first imaging device, and imaging data is captured from the object in the second position using a second imaging device, the synthetic projection of the initial 3D model from the first position to the second position may be made from a perspective of either the first imaging device or the second imaging device, or from another perspective.

Where textures of the synthetic 3D model in the second position deviate from textures represented in imaging data actually captured from the object in the second position, the 3D model may be adjusted accordingly. Such processes may be repeated, as necessary, for any number of sets of imaging data (e.g., frames) captured from the object until the textures of a synthetic 3D model and textures expressed in imaging data subsequently captured align with one another, e.g., until deviations in texture between the synthetic 3D model and the subsequently captured imaging data are within acceptable tolerances or insignificant.

Imaging data in the form of visual imaging data, or depth imaging data, may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, e.g., digital images and/or depth images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A digital image is a collection of pixels, typically arranged in an array, which defines an optically formed reproduction of one or more objects, backgrounds or other features of a scene and may be stored in a data file. In a digital image, each of the pixels represents or identifies a color or other light condition associated with a portion of such objects, backgrounds or features. For example, a black-and-white digital image includes a single bit for representing a light condition of the pixel in a binary fashion (e.g., either black or white), while a grayscale digital image may represent the light condition in multiple bits (e.g., two to eight bits for defining tones of gray in terms of percentages or shares of black-and-white), and a color digital image may include groups of bits corresponding to each of a plurality of base colors (e.g., red, green or blue), and the groups of bits may collectively represent a color associated with the pixel. A depth image, or a depth map, is also a collection of pixels that defines an optically formed reproduction of one or more objects, backgrounds or other features of a scene, and may also be stored in a data file. Unlike the pixels of a digital image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Presently, 3D models of objects, such as textured meshes, are typically formed from 3D point clouds generated from data captured using depth sensors or range cameras, and from 2D digital imagery (e.g., color digital images) captured using digital cameras or other imaging devices. A point cloud defines points of surfaces of an object in coordinate space, and forms a plurality of polygons (e.g., triangles) corresponding to aspects of the surfaces of the object. Digital images of such aspects may then be mapped or patched onto the polygons, in order to synthesize a computer-based representation of the object. Computer-based processes for generating point clouds of objects, or for mapping or patching texture-based imagery onto such point clouds, typically consume substantial amounts of computer resources, and are yet subject to seemingly insurmountable barriers of performance and precision, as depth images or other point samples of any density typically do not represent or embody an object's shape at its sharpest points, e.g., corners or edges, or accurately reflect regions of high curvature. Thus, point clouds that are formed from depth images or other point samples will not precisely represent depths of such corners, edges or contours, and inaccuracies in the modeling of shapes or structures within such point clouds will carry forward into the mapping or patching of digital imagery onto polygons defined by the respective points of such point clouds, and result in models having blurry or fuzzy textures.

Difficulties in 3D modeling are particularly acute where the objects being modeled are in motion. Existing image-based methods for modeling objects, including but not limited to structure-from-motion algorithms, structured light reconstruction techniques, laser scanning techniques or stereo triangulation have limited effectiveness when an object is moving, especially at operational frame rates of twenty frames per second (20 fps) or more, while point-based methods for modeling objects (e.g., infrared, or IR, or structured light methods) may not be used to identify and recognize textures. Therefore, for example, in an industrial setting or a fulfillment center environment, in which consumer items are arriving, departing or being stored in or retrieved from one or more storage areas at high rates of speed, generating precise 3D models of such items is presently a challenging task. Such settings or environments typically feature varying lighting, reflectance, occlusions or cluttered or partial views, or utilize commodity cameras that are not properly calibrated. Contemporary processes for modeling objects within such environments are easily overwhelmed by such physical, optical and computational limitations or hindrances.

Conveyor systems may be used to transport objects, items or materials of varying sizes and shapes, and typically include any number of machines or elements for causing the motion or translation of such objects, items or materials from one location to another. Any form of mover, e.g., belts, chains, screws, tracks or rollers, may drive the machines or elements that cause or enable such motion or translation and the objects, items or materials may be transported in a container or carrier, or on or within the mover itself. A conveyor system may further include one or more pulleys, shafts, hubs, bushings, sprockets, bearings and other elements for causing a movement of the conveyor. Further, a conveyor system may convey objects, items or materials into one or more static or dynamic apparatuses, such as a bin, a chute, a cart, a truck or another like machine.

One component commonly found in conveyor systems is a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, a chain conveyor may carry one or more pendants, which may be used to pull unit loads on pallets or in other large-scale containers. Conveyor systems may also include a gravity conveyor, which may consist of a series of rollers that may be used to move objects based on a difference in height, and a resulting difference in gravitational potential energy, without the use of a motor, or any other type of conveyor known to those of ordinary skill in the pertinent arts.

The systems and methods of the present disclosure are directed to generating 3D models (or surface models), such as textured meshes, of objects that are in motion. In some embodiments, the objects for which 3D models are generated may be placed on to fast-moving conveyor belts, and imaging data including color imaging data and/or depth imaging data may be captured from the objects while the objects are in motion at constant, known velocities. Relying on two fundamental assumptions regarding an object in motion, viz., that a velocity of the object is known, and that neither a shape nor a texture of the object will change while the object is in motion, the systems and methods of the present disclosure may be utilized to generate 3D models, such as textured meshes, of objects based on imaging data captured from such objects.

For example, a first set of imaging data may be captured from an object in a first position, e.g., an item in motion on a conveyor at a known velocity, at a first time. Using the first set of imaging data, which may include one or more depth images and/or color images, a point cloud of an object (or another representation of distances or depths to the object, or shapes of the object) may be formed. A textured mesh or other 3D model of an object may be defined using the point cloud portions of a color image of the object captured with the object in the first position and traveling at the known velocity. Segments or other portions of the color image may be mapped or patched onto polygons defined by respective points of the point cloud. In some embodiments, a point cloud of an object may be derived from a depth image of the object captured with the object in a first position and traveling at a known velocity. In other embodiments, a point cloud may be initially derived from one or more 2D images of the object, e.g., according to one or more structure-from-motion, stereo, active appearance and active shape modeling, shape from shading, laser scanning and meshing, structured light or other techniques.

Subsequently, a second set of imaging data may be captured from the object at a second position at a second time. Using the known velocity (e.g., direction and speed) of the conveyor and the object in motion thereon, the 3D model of the object defined using the first set of imaging data may be projected forward in a direction and by a distance of travel of the object defined by a product of a speed and an elapsed time between the first time and the second time, e.g., by advancing each of the vertices of the point cloud in the direction and by the distance. Likewise, the mapped or patched portions of the color image may be similarly projected forward based on the direction and the distance traveled by the object. A synthetic 3D model of the object at the second time may be defined using the projected-forward point cloud and the projected-forward mapped or patched portions of the color image. The 3D model formed at the second time is deemed "synthetic" because the 3D model is derived not from an actual depth image captured at the second time with the object at the second position, or from an actual color image captured at that time and with the object in that position, but based on projections forward of the point cloud formed based on imaging data captured at the first time and with the object at the first position, and the mapped or patched portions of the color image captured at that time and with the object in that position.

Once a 3D model of the object has been synthetically projected forward, e.g., from a perspective of an imaging device that captured the first set of imaging data, a perspective of an imaging device that captured the second set of imaging data, or from another perspective, textures of the synthetic 3D model may be compared to textures represented in the second set of imaging data, e.g., a color image of the object, captured at the second time and with the object in the second position. If the textures represented in the second set of imaging data are consistent with textures of the 3D model of the object, e.g., if a color image of the object captured at the second time may be accurately mapped or patched to the point cloud formed at the first time, then the 3D model need not require revision, and may be deemed adequate for use in any intended application or for any purpose. If the textures represented in the second set of imaging data are not consistent with textures of the 3D model of the object, e.g., if a color image of the object captured at the second time may not be accurately mapped or patched to the point cloud formed at the first time, however, then the positions of various points in the point cloud may be adjusted accordingly to correspond to the second set of imaging data. Thereafter, a third set of imaging data may be captured at a third time and with the object in a third position. The 3D model may be synthetically projected forward to the third position, e.g., from any perspective, and textures represented in a color image included in the third set of imaging data may be compared to textures of a synthetic 3D model of the object at the third position, which may be defined using a projected-forward 3D model, as adjusted based on the second set of imaging data.

The systems and methods of the present disclosure thus use texture consistency across multiple view reprojections upon a point cloud or other depth sample of an object. Because a texture of an object (e.g., colors, shading or other visual expressions represented on faces thereof) may be presumed to remain unchanged as the object travels in a constant velocity, the texture of the object and the constant velocity of the object may be used to refine both a geometry and a texture of a 3D model of the object, as the object moves. Such systems and methods utilize changing views of the object, as expressed in successive frames of imaging data captured thereof, to generate a 3D model by projecting a color image onto a point cloud or other representation of shape or structure, and to continuously refine the model by reprojecting color images that are subsequently or successively captured onto the 3D model, refining the point cloud or other representation as necessary, where the reprojected color images conflict with the 3D model.

Unlike most techniques for generating 3D models, the accuracy and the fidelity of 3D models are driven by texture, and not depth, shape or structure, in accordance with the present disclosure. Such models may be continuously refined as imaging data representing textures of the object are subsequently or successively captured. The generation of a 3D model of an object in motion in accordance with the present disclosure may begin with a limited or sparse number of points reflective of depth, shape or structure of the object, e.g., points determined from depth imaging data or visual imaging data captured from the object, and both structure and texture of the object may be refined as the object progresses in motion. Where an imaging device is configured to capture color imaging data at comparatively high frame rates, e.g., at frame rates of twenty to sixty frames per second (20 fps to 60 fps), an accurate 3D model of an object that enables text, bar codes or symbols provided on surfaces of the object to be read and interpreted, or enables shapes or affordances of the object to be identified for picking or routing applications, may be generated and refined in a real time or near-real time manner. The systems and methods disclosed herein are substantially different from existing surface reconstruction or modeling techniques, such as those which rely on structure-from-motion, stereo, active appearance and active shape modeling, shape from shading, laser scanning and meshing, structured light, or the like exclusively to form 3D models, and are computationally expensive. To the contrary, 3D models of objects formed in accordance with the present disclosure begin with a very simple 3D shape or structure and may be iteratively refined as images of the objects are captured.

3D models of surfaces or shapes may be accurately generated on the fly, e.g., in real time or in near-real time, rather than based on series of depth maps or point clouds, as embodiments of the present disclosure may utilize successive digital images for refinement of both structures and textures of surfaces of objects. Such embodiments may leverage relative movement of an object with respect to an imaging device (e.g., where the object is motion and the imaging device is stationary, where the object is stationary and the imaging device is in motion, or where the object and the imaging device are in motion at different velocities), and to use successive digital images to refine a putative shape model by generating successive reprojections in real time or in near-real time.

The systems and methods disclosed herein offer a number of improvements to existing 3D imaging and modeling technologies. Currently, as is noted above, many imaging devices, such as RGBz digital cameras, use structured light, time-of-flight, or stereo techniques exclusively in order to generate 3D depth maps or point clouds separate and apart from color images (e.g., RGB images). The transmission, processing and storage of 3D models may be expensive, both computationally and financially, and are typically not available for use in online or mobile applications. Thus, a capacity to generate a simplest possible 3D model that most accurately represents both surface geometries and surface textures of objects may be critically useful in such applications. Moreover, stereo algorithms or structure-from-motion algorithms typically generate mesh points or vertices for objects that are not guaranteed to locate extremal points (or points of inflexion) of the objects' surface geometries. Whether a set of vertices or a point cloud defined by such algorithms is sparse or dense, the vertices or point clouds generated thereby can neither accurately capture such surface geometries nor form a best possible texture representation due to inaccuracies in the placement of such vertices or points within a surface geometry.

In some embodiments, a 3D model or a surface model may be generated based on depth information and/or textures of a single surface of an object, or fewer than all surfaces of the object, rather than each of the surfaces of the object. For example, where a specific surface of an object is relevant to a specific function or application, once the specific surface of the object is identified in a 3D model or a surface model, only that specific surface need be subject to further evaluation, updating or tracking. Other surfaces of the object may be evaluated, updated or tracked on less frequent bases, or not at all.

Furthermore, because embodiments of the present disclosure are frequently subject to imaging at high frame rates, e.g., frame rates of twenty to sixty frames per second (20 fps to 60 fps), a 3D model or surface model of an object may be updated to include a best available image of the object over time. Thus, even after the 3D model or surface model of the object is deemed sufficient, a clearest or sharpest image of one or more surfaces of the object may be updated, over time, to improve the clarity and quality of the model. For example, where a 3D model or surface model of an object is generated based on an image of a surface of the object that includes specular reflections (e.g., points at which light is reflected at a definite angle toward a lens and/or image sensor) or other disturbances or impurities, a subsequent image of that surface that does not include the specular reflection, disturbances or impurities may be incorporated into the 3D model or surface model at a later time.

The textured meshes or other 3D models that are generated in accordance with the systems and methods of the present disclosure may be used for any purpose. For example, textured meshes of objects may be used in navigating ground-based or aerial vehicles (e.g., automobiles or drones), identifying surfaces for picking and grasping of objects, generating imaging data in virtual reality applications, or in any other applications.

Figure 2:
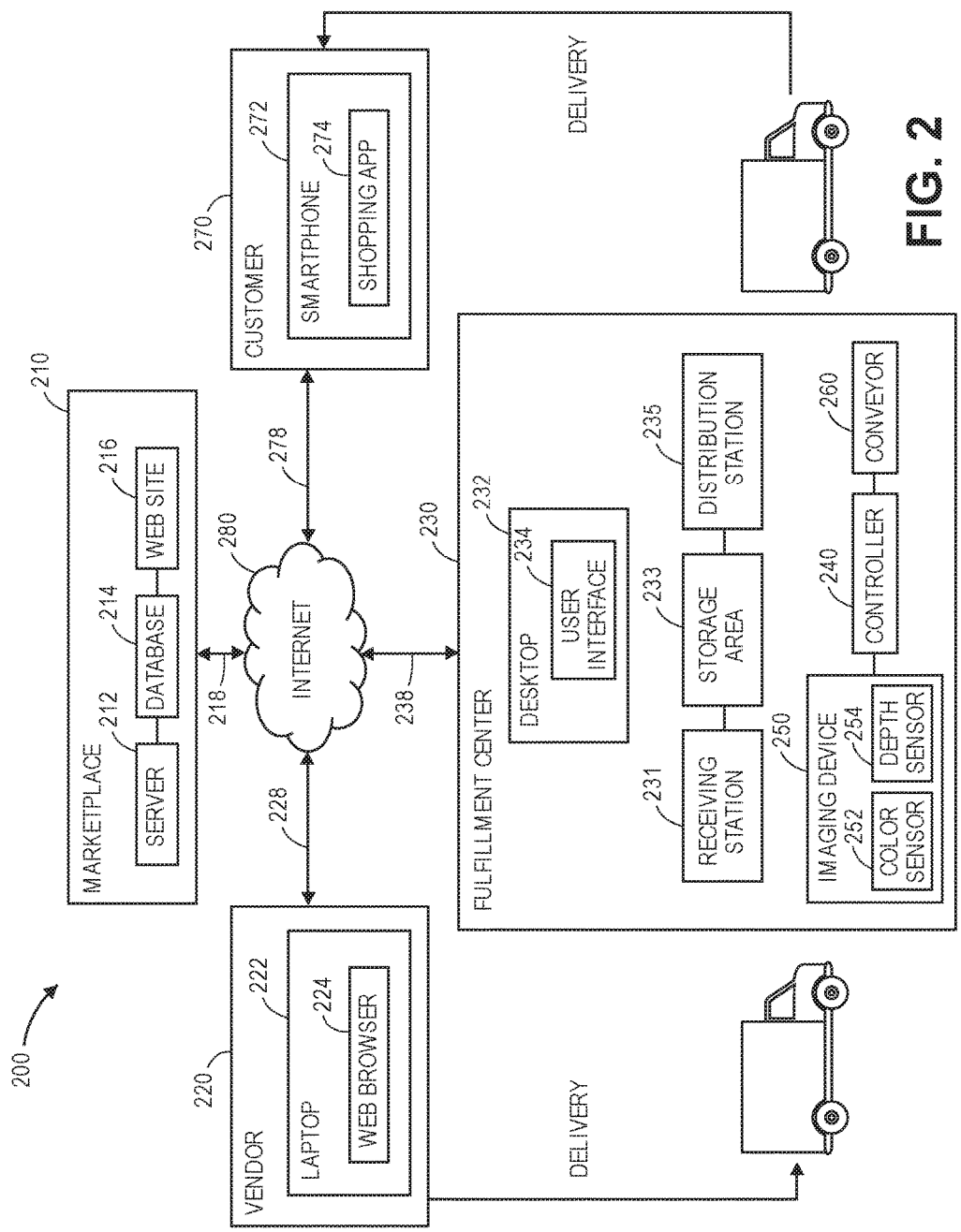
FIG. 2 is a block diagram of components of one system for generating textured three-dimensional models in accordance with embodiments of the present disclosure.

Referring to FIG. 2, a block diagram of one system 200 for generating textured three-dimensional models in accordance with embodiments of the present disclosure is shown. The system 200 includes a marketplace 210, a vendor 220, a fulfillment center 230 and a customer 270 that are connected to one another across a network 280, such as the Internet. Except where otherwise noted, reference numerals preceded by the number "2" shown in FIG. 2 indicate components or features that are similar to components or features having reference numerals preceded by the number "1" shown in FIGS. 1A through 1F.

The marketplace 210 may be any entity or individual that wishes to make items from a variety of sources available for download, purchase, rent, lease or borrowing by customers using a networked computer infrastructure, including one or more physical computer servers 212 and databases 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by or delivered to customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a desktop computer 232, as well as stations for receiving, storing and distributing items to customers, including but not limited to a receiving station 231, a storage area 233 and a distribution station 235. As is also shown in FIG. 2, the fulfillment center 230 further includes a controller 240 in communication with an imaging device 250 and a conveyor 260.

The fulfillment center 230 may operate one or more order processing and/or communication systems using a computing device such as the desktop computer 232 and/or software applications having one or more user interfaces 234 (e.g., a browser), or through one or more other computing devices or machines that may be connected to the network 280, as is indicated by line 238, in order to transmit or receive information in the form of digital or analog data, or for any other purpose. The computer 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The computer 232 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations of one or more of the receiving station 231, the storage area 233 or the distribution station 235, as well as the controller 240. Such control systems may be associated with the computer 232 or with one or more other computing devices or machines, and may communicate with the controller 240 within the fulfillment center 230 by any known wired or wireless means, or with the marketplace 210, the vendor 220 or the customer 270 over the network 280, as indicated by line 238, through the sending and receiving of digital data.

The controller 240 may be any computer-based control system configured to control the operation of the imaging device 250 and/or the conveyor 260. The controller 240 may include one or more computer processors, computer displays and/or data stores, or one or more other physical or virtual computer device or machines (e.g., an encoder for synchronizing operations of the imaging device 250 and the conveyor 260). The controller 240 may also be configured to transmit, process or store any type of information to one or more external computer devices or servers over the network 280. Additionally, the controller 240 may also provide one or more electronic instructions or communications to one or more workers or staff members (not shown in FIG. 2), who may handle or transport items within the fulfillment center 230, and may operate one or more computing devices such as a general purpose device such a personal digital assistant, a digital media player, a smartphone, a tablet computer, a desktop computer or a laptop computer, which may include any form of input and/or output peripherals such as scanners, readers, keyboards, keypads, touchscreens or like devices.

The imaging device 250 may comprise any form of optical recording sensor or device that may be used to photograph or otherwise record information or data (e.g., still or moving images captured at any frame rates) regarding activities occurring within one or more areas or regions of an environment within the fulfillment center 230, e.g., the conveyor 260 and any objects provided thereon, or for any other purpose. As is shown in FIG. 2, the imaging device 250 is connected to the network 280 and includes one or more sensors, e.g., a color sensor 252 (or a grayscale sensor or black and white sensor) configured to capture visual imaging data (e.g., textures) and a depth sensor 254 configured to capture depth imaging data (e.g., ranges) to objects within one or more fields of view of the imaging device 250. Additionally, the imaging device 250 may further include one or more memory or storage components such as a database or another data store), one or more processors, and any other components (not shown) that may be required in order to capture, analyze and/or store imaging data from within the fulfillment center 230 environment in which the imaging device 250 is provided.

For example, the imaging device 250 may capture one or more still or moving images, along with any relevant audio signals or other information, and may also connect to or otherwise communicate with the desktop computer 232, the controller 240, the conveyor 260, or any other computer devices within the fulfillment center 230 (not shown), or with one or more external computer devices over the network 280, through the sending and receiving of digital data. Although the system 200 shown in FIG. 2 includes just one imaging device 250 provided in the fulfillment center 230, any number or type of imaging devices or sensors may be provided within any number of environments in accordance with the present disclosure. For example, the imaging device 250 may be an RGBz or RGBD device having both the color sensor 252 and the depth sensor 254. Alternatively, two or more imaging devices 250 may be provided within the fulfillment center 230, each including imaging devices having either a color sensor (or grayscale sensor or black and white sensor) or a depth sensor, or both a color sensor and a depth sensor.

As is shown in FIG. 2, the conveyor 260 may be any conveying system for transporting objects within the fulfillment center 230 and may include one or more conveying components, processors and/or drive units. Those of ordinary skill in the pertinent art will recognize that conveying systems, such as the conveyor 260, may be used to transport objects, items or materials of varying sizes and shapes, and typically include any number of machines or elements for causing the motion or translation of such objects, items or materials from one location to another. The machines or elements that cause or enable such motion or translation may be operated by a computer device such as the desktop computer 232, and may be driven by any form of mover, including belts, chains, screws, tracks or rollers, e.g., by one or more drive units. Additionally, the objects, items or materials to be moved via the conveyor 260 may be transported in a container or carrier, or on or within the mover itself. In addition to a drive unit, the conveyor 260 may further include one or more pulleys, shafts, hubs, bushings, sprockets, bearings and other elements (not shown) for causing a movement of the conveyor 260. Further, the conveyor 260 may convey objects, items or materials into one or more static or dynamic apparatuses, such as a bin, a chute, a cart, a truck or another like machine.

The conveyor 260 may take the form of a conveyor belt, which may include a banded continuous-loop belt (e.g., rubber or fabric) that is placed into motion by a series of two or more pulleys, at least one of which is driven by a motor, such as a drive unit. Objects, items or materials may be placed directly onto the conveyor 260, or into one or more bins or like containers that may be placed on the conveyor 260. Similarly, the conveyor 260 may also take the form of a chain conveyor, and may carry one or more pendants, which may be used to pull unit loads on pallets or in other large-scale containers. The conveyor 260 may also take the form of a gravity conveyor, which may consist of a series of rollers that may be used to move objects based on a difference in height, and a resulting difference in gravitational potential energy, without the use of a motor.

The customer 270 may be any entity or individual that wishes to download, purchase, rent, lease, borrow or otherwise obtain items (which may include goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center" or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the fulfillment center 230 and/or the desktop computer 232 may be adapted to transmit information or data in the form of synchronous or asynchronous messages to the server 212, the laptop computer 222, the smartphone 262 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the desktop computer 232 or the smartphone 262, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
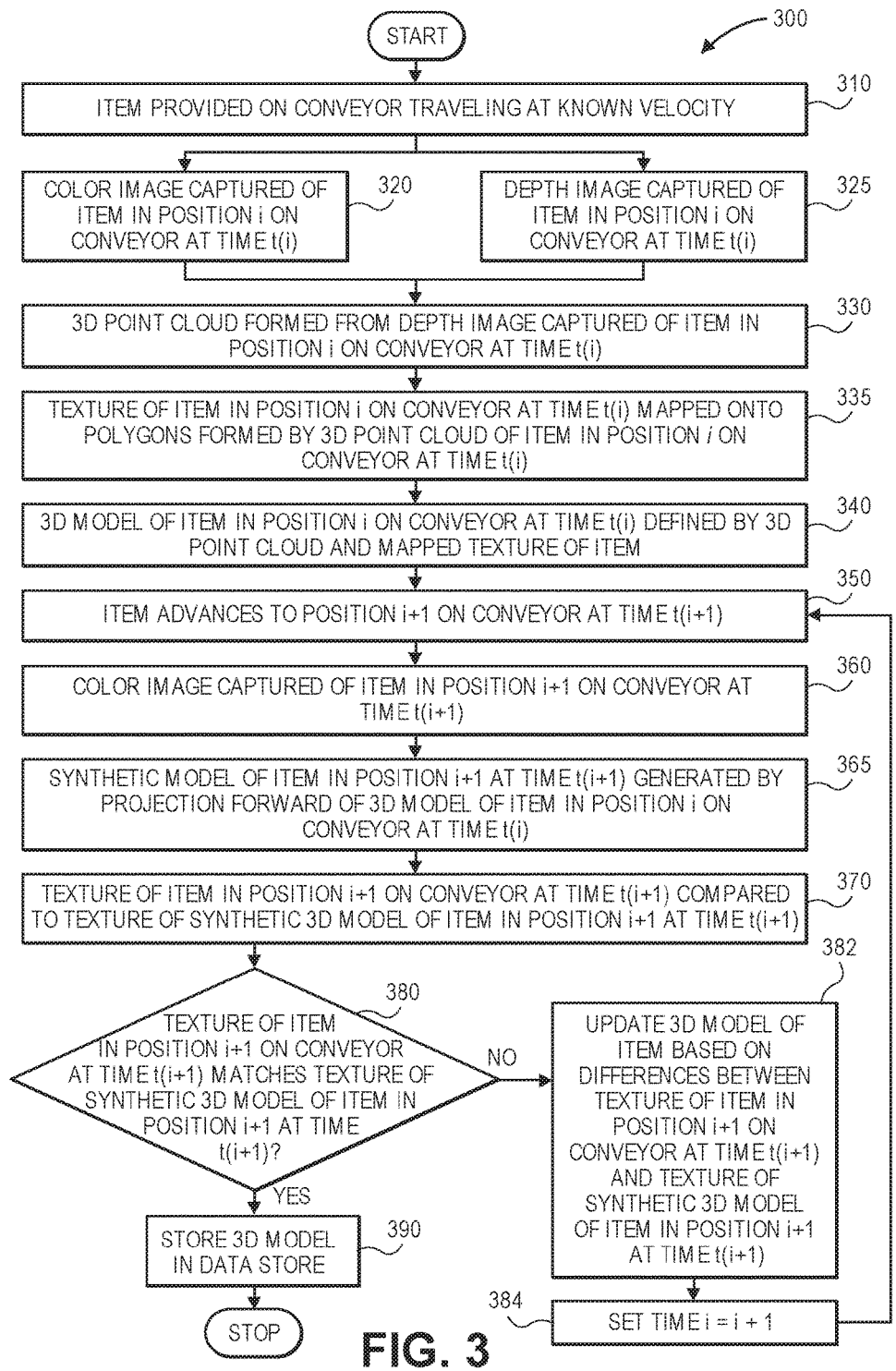
FIG. 3 is a flow chart of one process for generating textured three-dimensional models in accordance with embodiments of the present disclosure.

As is discussed above, the systems and methods of the present disclosure are directed to defining and refining 3D textured models of objects in motion, including but not limited to objects on conveyors or other systems within a fulfillment center environment. Referring to FIG. 3, a flow chart 300 of one process for generating textured three-dimensional models in accordance with embodiments of the present disclosure is shown. At box 310, an item provided on a conveyor travels at a known velocity. The item may be any type of physical consumer item having any shape, either within a container or not, and resting on a moving surface of the conveyor or other moving system. At box 320, a color image is captured of the item in position i on the conveyor at time t(i) and, in parallel, at box 325, a depth image is captured of the item in the position i on the conveyor at time t(i). The color image and the depth image may be captured using a single imaging device having both color sensors and depth sensors, or, alternatively, using two discrete devices. Alternatively, visual imaging data other than a color image (e.g., a grayscale or black-and-white image), and depth imaging data other than a depth image (e.g., any type or form of ranging data) may be captured. As yet another alternative, a depth image need not be captured from the item on the conveyor at time t(i). Instead, depth information regarding the item at time t(i) may be determined from one or more color images captured at time t(i), according to one or more image-based techniques (e.g., structure-from-motion, stereo triangulation or the like).

At box 330, a 3D point cloud is formed from the depth image captured of the item in position i on the conveyor at time t(i). The 3D point cloud may approximately represent one or more aspects of the item in three-dimensional space, e.g., according to a Cartesian coordinate system, by a series of points. At box 335, a texture of the item in the position i on the conveyor at time t(i) is mapped onto one or more polygons formed by the 3D point cloud in the position i on the conveyor at time t(i). For example, line segments connecting points of the 3D point cloud may define a plurality of polygons (e.g., triangles) that are representative of surface features of the item. Portions or sectors of the color image identified as corresponding to the surface features of the item may be mapped onto their respective polygons accordingly.

At box 340, a 3D model of the item in the position i on the conveyor at time t(i) is defined by the 3D point cloud and the mapped texture of the item. Information or data representing the 3D model including, but not limited to, coordinates of points, dimensions of lines or segments extending between such points, or portions or sectors of the color image mapped to polygons defined by such lines or segments may be stored in one or more data stores. At box 350, the item advances to position i+1 on the conveyor at time t(i+1) where, at box 360, a color image is captured of the item. For example, the color image may be captured using the same imaging device that captured the color image at box 320, e.g., if the position i+1 is included within a field of view thereof, or one or more other imaging devices. At box 365, a synthetic 3D model of the item in the position i+1 on the conveyor at time t(i+1) is generated by projecting forward the 3D model of the item in the position i on the conveyor at time t(i). For example, where the velocity of the conveyor is known and constant, the item may be presumed to travel at the same velocity. Thus, the various points of the 3D point cloud formed at box 330 may be advanced in a manner consistent with that same velocity, and projected forward by the distance between the position i and the position i+1, which may be determined as a product of the velocity and the difference between the time t(i) and the time t(i+1). Similarly, the texture of the item in the position i as mapped onto the polygons formed by the 3D point cloud at box 335 may also be projected forward by the same distance.

At box 370, the texture of the item in the position i+1 on the conveyor at time t(i+1) determined from the color image captured at box 360 is compared to the texture of the synthetic 3D model of the item at time t(i+1). For example, the dimensions and shaping of the item represented in the color image that was actually captured with the item in the position i+1 may be compared to the dimensions and shaping of the synthetic 3D model of the item at time t(i+1). Because the texture of the item is presumed to remain unchanged during its transit along the conveyor, the texture of the synthetic 3D model of the item at time t(i+1) would, in theory, be identical to the texture of the item represented in the color image if the 3D model of the item at time t(i) accurately and precisely represented the dimensions and shaping of the item.

At box 380, if the texture of the item in the position i+1 on the conveyor at time t(i+1) determined from the color image captured at box 360 matches the texture of the synthetic 3D model of the item in the position i+1 on the conveyor at time t(i+1), then the process advances to box 390, where the 3D model is stored in a data store, and the process ends. If the texture of the item in the position i+1 on the conveyor at time t(i+1) does not match the texture of the synthetic 3D model of the item in the position i+1 on the conveyor at time t(i+1), then the process advances to box 382, where the 3D model is updated based on the differences between the texture of the item in the position i+1 on the conveyor at time t(i+1) and the texture of the synthetic 3D model of the item in the position i+1 on the conveyor at time t(i+1). For example, where one or more corners, edges or spatial features represented in the color image captured at box 360 differs from the same corners, edges or spatial features in the synthetic 3D model, then the 3D model may be adjusted accordingly. At box 384, a value of the variable i is incrementally advanced by 1, i.e., to i+1, and the process returns to box 350, where the item is advanced to the new position i+1 on the conveyor at time t(i+1). Process steps or actions represented in boxes 350, 360, 365, 370 and 382 may be repeated, as necessary, until a texture of a synthetic 3D model at a given time matches a texture of the item represented in a color image captured of the item at the given time.

Figure 4:
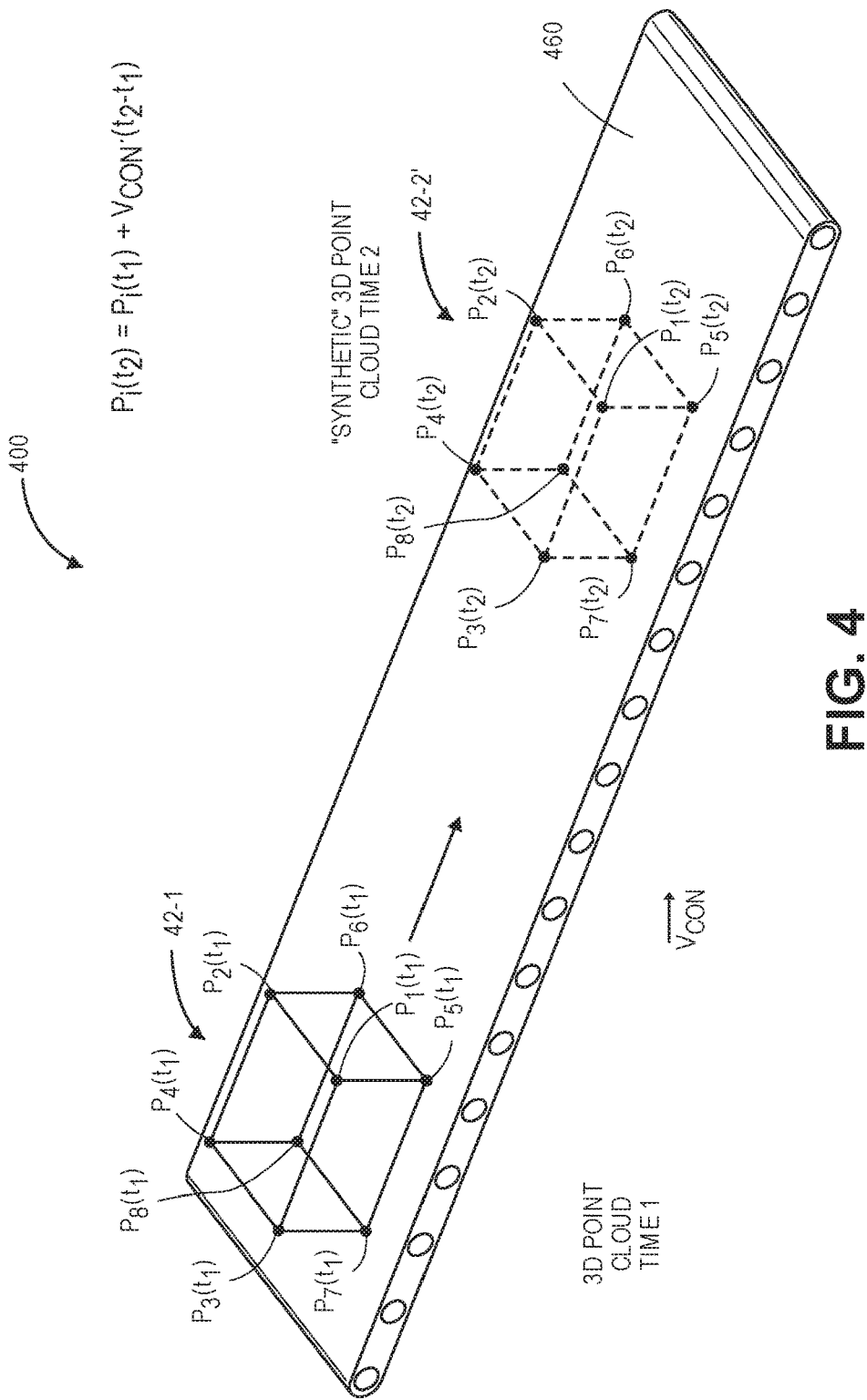
FIG. 4 is a view of aspects of one system for generating textured three-dimensional models in accordance with embodiments of the present disclosure.

As is discussed above, a "synthetic" 3D model of an item at one time may be generated, from any perspective, based on a 3D model of the item at another time where a velocity of the item is known by digitally advancing the 3D model of the item forward by a distance determined by a product of the velocity and a difference between the two times. Referring to FIG. 4, a view of aspects of one system 400 for generating textured three-dimensional models in accordance with embodiments of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1F.

As is shown in FIG. 4, the system 400 includes a conveyor 460, and a 3D point cloud 42-1 formed from imaging data captured of an item traveling on the conveyor 460 at a velocity $V_{CON}$ at time 1 is shown. The 3D point cloud 42-1 is defined by a plurality of points $P_1(t_1)$, $P_2(t_1)$, $P_3(t_1)$, $P_4(t_1)$, $P_5(t_1)$, $P_6(t_1)$, $P_7(t_1)$, $P_8(t_1)$ at time 1, which may be represented by coordinates according to one or more coordinate systems (e.g., a Cartesian coordinate system). As is also shown in FIG. 4, a synthetic 3D point cloud 42-2' may be generated for the item at time 2 by advancing each of the points $P_1(t_1)$, $P_2(t_1)$, $P_3(t_1)$, $P_4(t_1)$, $P_5(t_1)$, $P_6(t_1)$, $P_7(t_1)$, $P_8(t_1)$ of the 3D point cloud 42-1 forward by a distance defined by a product of the velocity $V_{CON}$ and a difference between time 2 and time 1, or $P_i(t_2)=P_i(t_1)+V_{CON}\cdot(t_2-t_1)$, for each of the eight points $P_i$, viz., $P_1$, $P_2$, $P_3$, $P_4$, $P_5$, $P_6$, $P_7$, $P_8$.

Figure 5A:
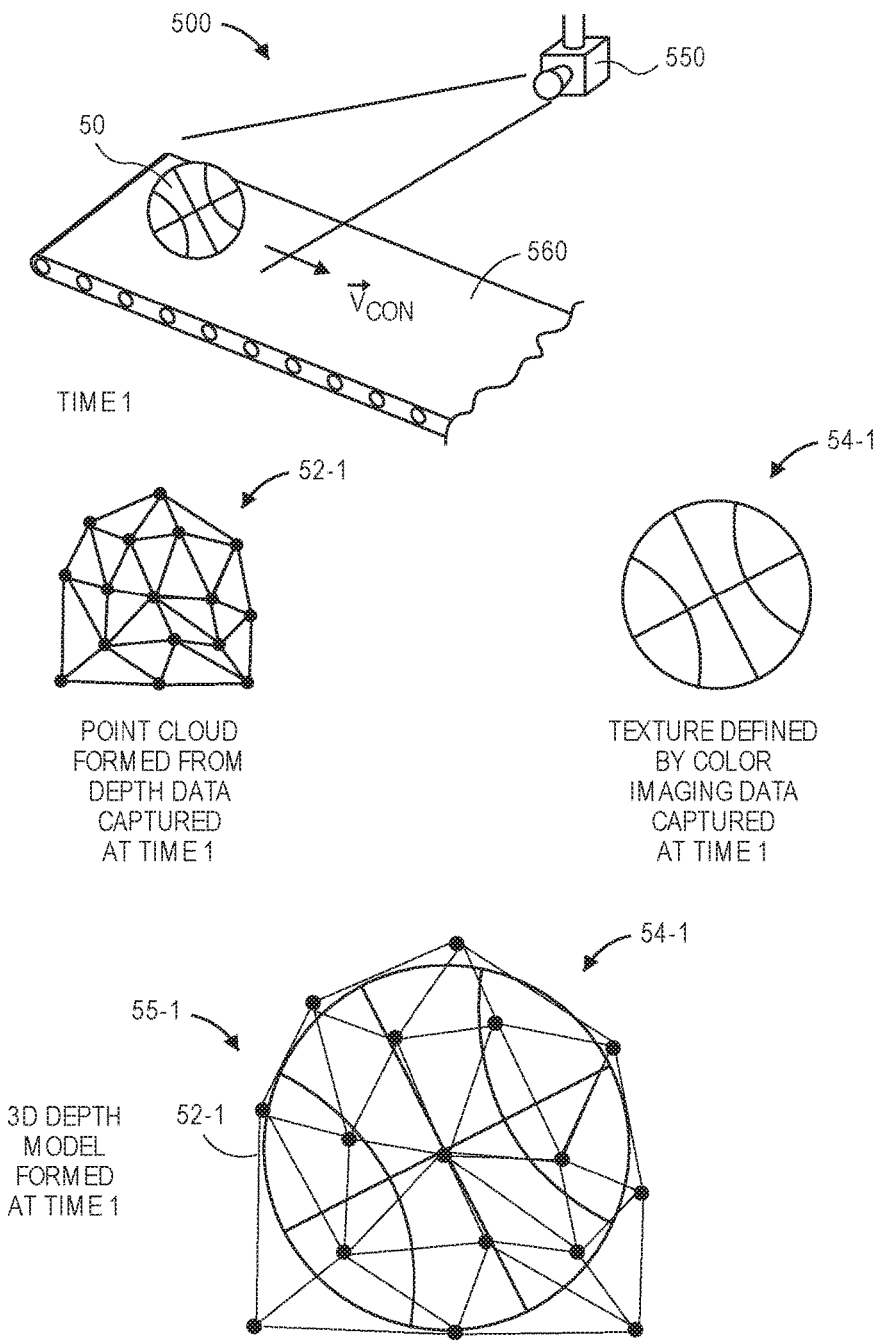
FIG. 5A and FIG. 5B are views of aspects of a system for generating textured three-dimensional models in accordance with embodiments of the present disclosure.
Figure 5B:
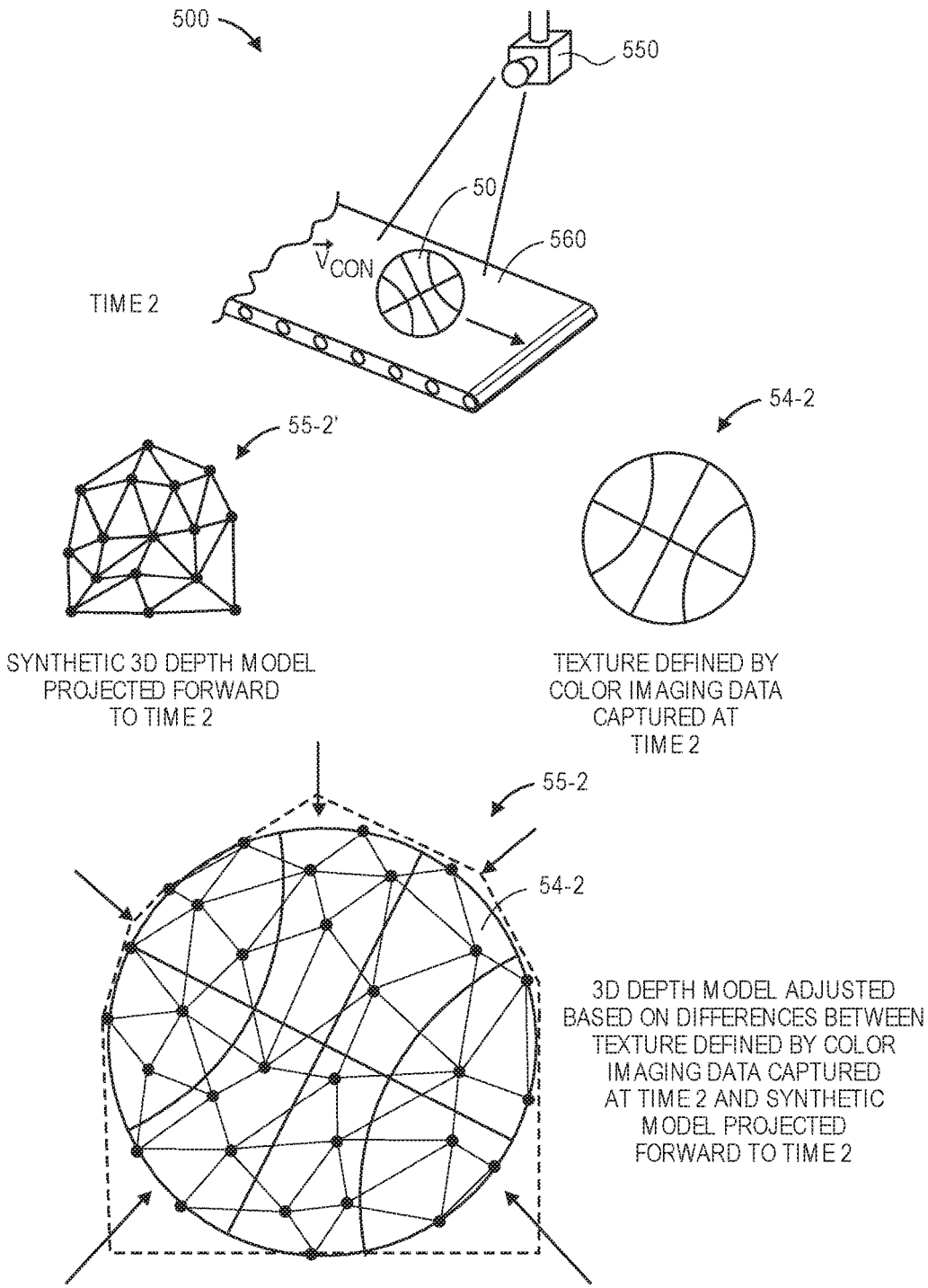

As is also discussed above, differences between textures of a synthetic 3D model defined at a given time and textures expressed in imaging data captured at that given time may be used to adjust the 3D model accordingly, until differences between textures of synthetic 3D models subsequently defined and imaging data subsequently captured are insubstantial in nature and extent. Referring to FIGS. 5A and 5B, views of aspects of one system 500 for generating textured three-dimensional models in accordance with embodiments of the present disclosure is shown. Except where otherwise noted, reference numerals preceded by the number "5" shown in FIGS. 5A and 5B indicate components or features that are similar to components or features having reference numerals preceded by the number "4" shown in FIG. 4, by the number "2" shown in FIG. 2 or by the number "1" shown in FIGS. 1A through 1F.

As is shown in FIG. 5A, the system 500 includes an imaging device 550 and a conveyor 560. An item 50 (viz., a substantially spherical basketball) is positioned on the conveyor 560 at a time 1, and is traveling at an operating velocity $V_{CON}$ of the conveyor 560. Using depth imaging data and/or color imaging data captured from the item 50 by the imaging device 550 at time 1, a 3D point cloud 52-1 representative of the item 50 is formed, and a texture 54-1 of the item 50 is defined. Subsequently, as is also shown in FIG. 5A, a 3D model 55-1 of the item 50 is defined using the 3D point cloud 52-1 and the texture 54-1. The 3D model 55-1 of the item 50 so defined has a substantially cylindrical base with a rounded upper end, as is determined by the 3D point cloud 52-1. Portions of the texture 54-1 of the item 50 are mapped to polygons formed by line segments extending between respective points of the 3D point cloud 52-1.

In accordance with the present disclosure, the 3D model 55-1 of the item 50 may be revised over time based on texture data subsequently captured from the item 50. The texture data may be compared to synthetic representations of the 3D model 55-1 corresponding to times at which the texture data was captured. If the differences between the synthetic representations of the 3D model and the texture data captured are significant, the 3D model may be modified accordingly. As is shown in FIG. 5B, the 3D model 55-1 defined based on the depth data and the texture data captured at time 1 may be projected forward to time 2 to define a synthetic 3D model 55-2' based on a product of the conveyor velocity $V_{CON}$ and a difference between time 2 and time 1. Subsequently, a texture 54-2 defined by color imaging data captured at time 2 may be compared to a texture of the synthetic 3D model 55-2'. Based on any differences between the texture of the synthetic 3D model 55-2' and the texture 54-2, a new 3D model 55-2 may be formed by repositioning one or more points of the 3D model 55-1 defined from depth data captured at time 1 to more closely correspond to the texture 54-2 defined from color imaging data captured at time 2, by adding one or more points to the 3D model 55-1 based on the texture 54-2, or by removing one or more points from the 3D model 55-1 based on the texture 54-2.

Synthetic 3D models may be defined by adjusting 3D models in any manner to account for a velocity of an object, such as by projecting the 3D models in a direction of travel of the object (e.g., the synthetic 3D model 55-2' of FIG. 5B, which was formed by projecting the 3D model 55-1 of FIG. 5A in a forward direction). Alternatively, a synthetic 3D model may be defined using historical data, such as by defining a 3D model based on imaging data captured at a given time, synthetically projecting the 3D model backward to define a synthetic 3D model from an earlier time, and comparing the synthetic 3D model to textures represented in imaging data captured at the earlier time. Defining a 3D model based on depth data and texture data captured at a later time, and projecting the 3D model backward to define a synthetic 3D model corresponding to an earlier time, may be preferable in instances in which depth data captured at the later time is more accurate than depth data captured at the earlier time, or in any other instances.

Figure 6A:
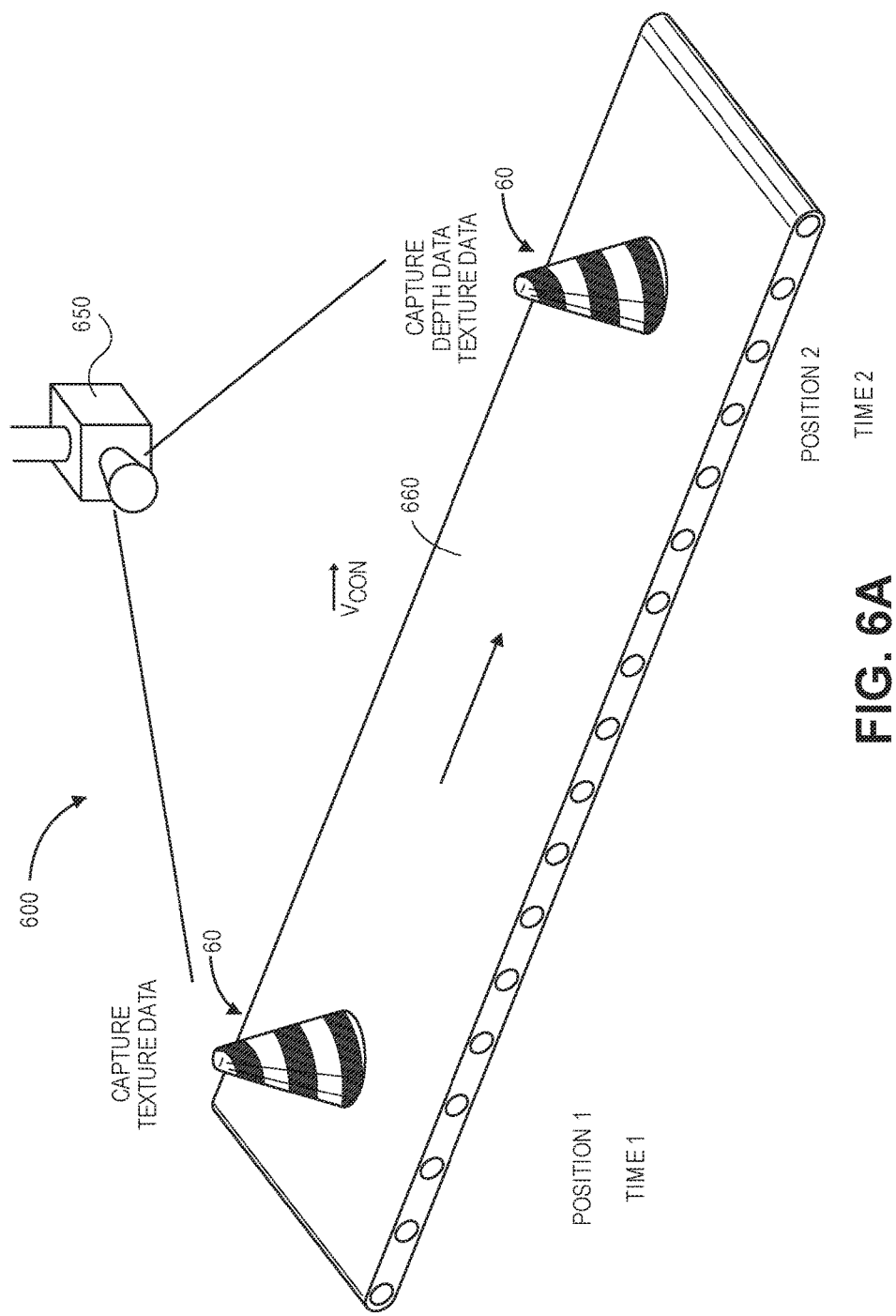
FIG. 6A and FIG. 6B are views of aspects of a system for generating textured three-dimensional models in accordance with embodiments of the present disclosure.
Figure 6B:
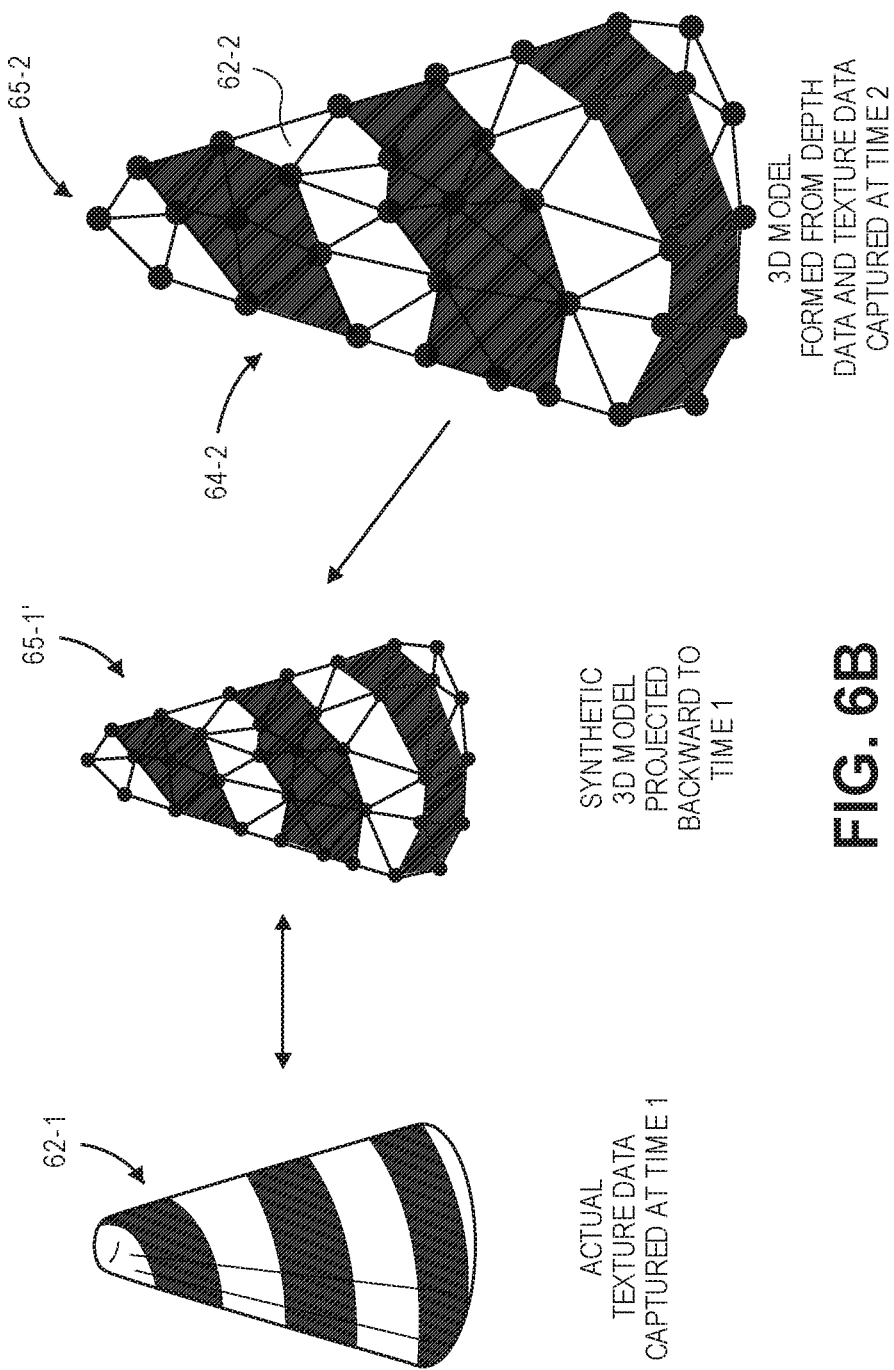

Referring to FIGS. 6A and 6B, views of aspects of one system 600 for generating textured three-dimensional models in accordance with embodiments of the present disclosure is shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "4" shown in FIG. 4, by the number "2" shown in FIG. 2 or by the number "1" shown in FIGS. 1A through 1F.

As is shown in FIG. 6A, the system 600 includes an imaging device 650 and a conveyor 660. An item 60 (viz., a substantially conic object) is positioned on the conveyor 660, and is traveling at an operating velocity $V_{CON}$ of the conveyor 660. Depth data and texture data is captured from the item 60 in a second position at a second time, and texture data was captured from the item 60 in a first position at a first time.

As is shown in FIG. 6B, a 3D model 65-2 may be formed from the depth data and the texture data captured from the item 60 at the second time, e.g., by defining a 3D point cloud from depth data 62-2 captured at the second time, and mapping portions of texture data 64-2 captured at the second time onto polygons or other sections formed by line segments connecting the respective points of the 3D point cloud. The 3D model 65-2 may be projected backward to form a synthetic 3D model 65-1' corresponding to the first position and the first time, and compared to texture data 64-1 captured with the item 60 in the first position at the first time. Any substantial differences between textures of the synthetic 3D model 65-1' and the texture data 64-1 may be used to modify the 3D model 65-2 accordingly, until a sufficiently accurate and precise representation of the item 60 is obtained.

Figure 7:
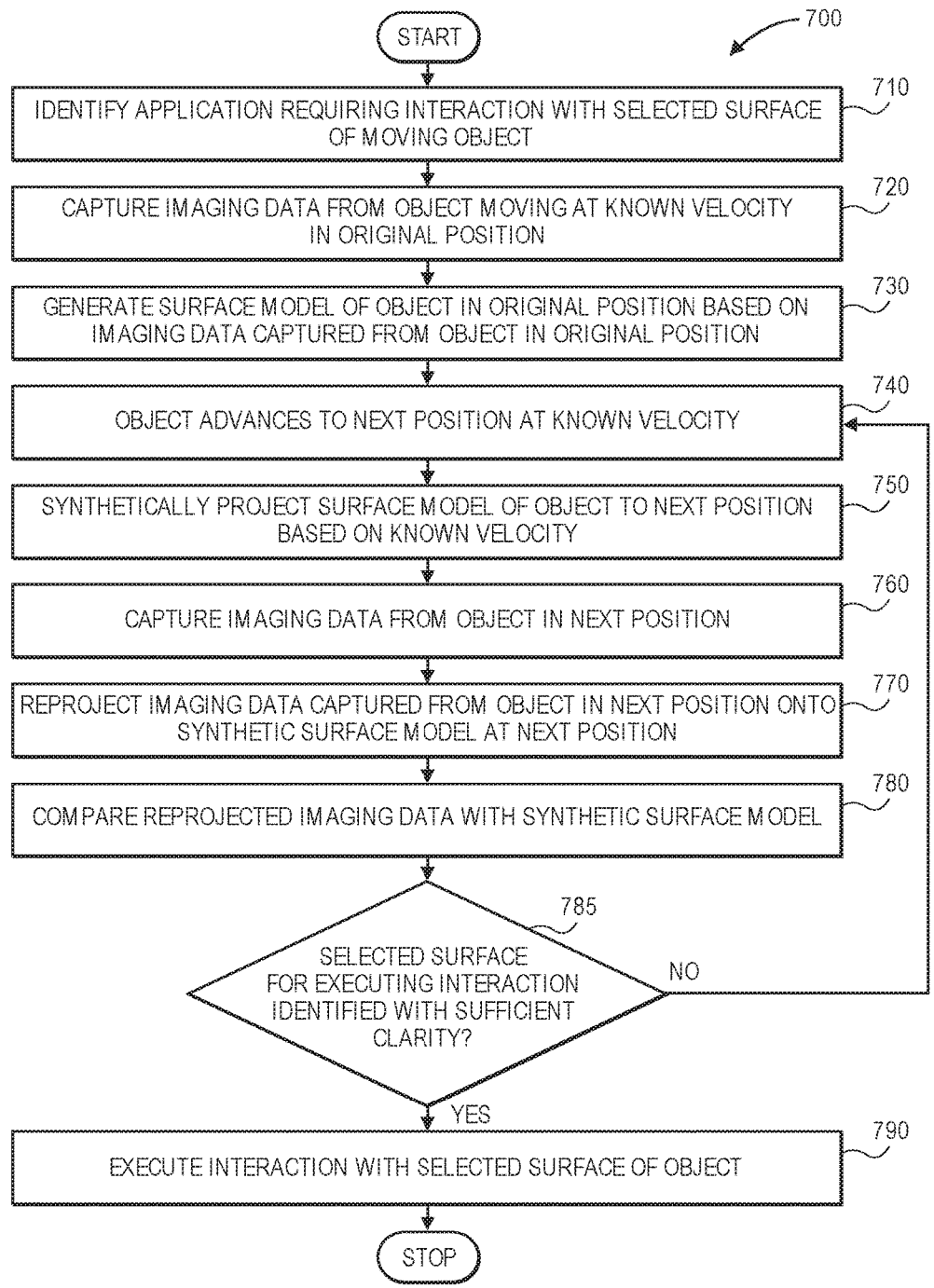
FIG. 7 is a flow chart of one process for generating textured three-dimensional models in accordance with embodiments of the present disclosure.

A 3D model or surface model of an object obtained in accordance with the present disclosure may be utilized for any purpose. For example, where a specific function or application involving an item requires an identification of and interaction with a specific surface of the item, a sufficiently accurate and precise representation of the item may be used to identify and select one or more surfaces for performing the function or for executing the application. Referring to FIG. 7, a flow chart 700 of one process for generating textured three-dimensional models in accordance with embodiments of the present disclosure is shown. At box 710, an application requiring an interaction with a selected surface of a moving object is identified. For example, where an item to be stored within a storage area of a fulfillment center, a warehouse or another like environment is placed on a conveyor, the item may be subjected to one or more diversion, interpretation or classification applications while traveling on the conveyor. At box 720, imaging data may be captured from the object while the object is moving at a known velocity. For example, referring again to the system 100 of FIGS. 1A through 1F, one or more imaging devices 150 may be aligned to include the conveyor 160 within a field of view thereof, and to capture depth imaging data, visual imaging data or any other information or data regarding objects traveling on the conveyor 160, including but not limited to the item 10.

At box 730, a surface model of the object is generated based on the imaging data captured from the object in the original position. For example, where the imaging data includes one or more depth images or other ranging data, the depth model may be created according to one or more point-based techniques (e.g., structured light-based reconstruction or the like). Where the imaging data includes one or more color, grayscale and/or black and white images, a depth model may be created according to one or more image-based techniques (e.g., structure-from-motion, stereo triangulation or the like).

At box 740, the object advances to a next position at a known velocity. The velocity may be constant or variable, and a distance to (or location of) the next position may be derived based on a product of the velocity and an elapsed time since the object was in the original position, or from an integration of a velocity function over the elapsed time, or in any other manner. At box 750, the surface model of the object is synthetically projected to the next position based on the known velocity. For example, because the object is presumed to travel at an operating speed or velocity of the conveyor, each of the points or surfaces of the surface model is also presumed to travel at the operating speed or velocity of the conveyor. At box 760, imaging data is captured from the object in the next position. The imaging data may include depth imaging data, visual imaging data, both depth imaging data and visual imaging data, or any other information or data that may be optically captured from the object using one or more imaging devices.

At box 770, the imaging data captured from the object in the next position is reprojected onto the synthetic surface model at the next position. As is discussed above, dimensions and textures of objects traveling on a conveyor may reasonably be presumed to remain constant. Therefore, theoretically, imaging data captured from the object in the original position should be consistent with imaging data captured from the object in the next position. At box 780, the reprojected imaging data is compared to the synthetic surface model.

At box 785, whether a selected surface for executing an interaction with the object may be identified with sufficient clarity based on the comparison of the reprojected imaging data to the synthetic surface model is determined. If the selected surface may be identified, then the process advances to box 790, where the interaction with the selected surface is executed, and the process ends. For example, where a surface of the object having one or more marked identifiers (e.g., bar codes) is identified based on the surface model, the marked identifiers may be captured using imaging data or scanned or interpreted by one or more scanning devices in accordance with the present disclosure. Alternatively, where a sufficiently flat surface is identified on the object based on the surface model, a diverter or other apparatus may be commanded to come into contact with the sufficiently flat surface, as necessary, in order to reposition the object on the conveyor, or to remove the object from the conveyor.

If the selected surface may not be identified with sufficient clarity within the surface model, however, the process returns to box 740, where the object advances to a next position. Process steps or actions represented in boxes 740, 750, 760, 770, 780 and 785 may be repeated, as necessary, until the selected surface is identified with sufficient clarity within the 3D model, and a desired interaction with the selected surface may be executed accordingly. Moreover, after the selected surface of the object is identified within the surface model, only aspects of the selected surface (e.g., distances or depths to aspects of the selected surface, or textures of the selected surface) need be tracked and updated based on differences in textures of a surface model of that selected surface and textures represented in imaging data captured from the selected surface. Textures of other surfaces may be ignored, or tracked and updated at different rates or in accordance with a different schedule.

Referring to FIGS. 8A through 8D, views of aspects of a system 800 for generating textured three-dimensional models in accordance with embodiments of the present disclosure are shown. Except where otherwise noted, reference numerals preceded by the number "8" shown in FIGS. 8A through 8D indicate components or features that are similar to components or features having reference numerals preceded by the number "6" shown in FIGS. 6A and 6B, by the number "5" shown in FIGS. 5A and 5B, by the number "4" shown in FIG. 4, by the number "2" shown in FIG. 2 or by the number "1" shown in FIGS. 1A through 1F.

Figure 8A:
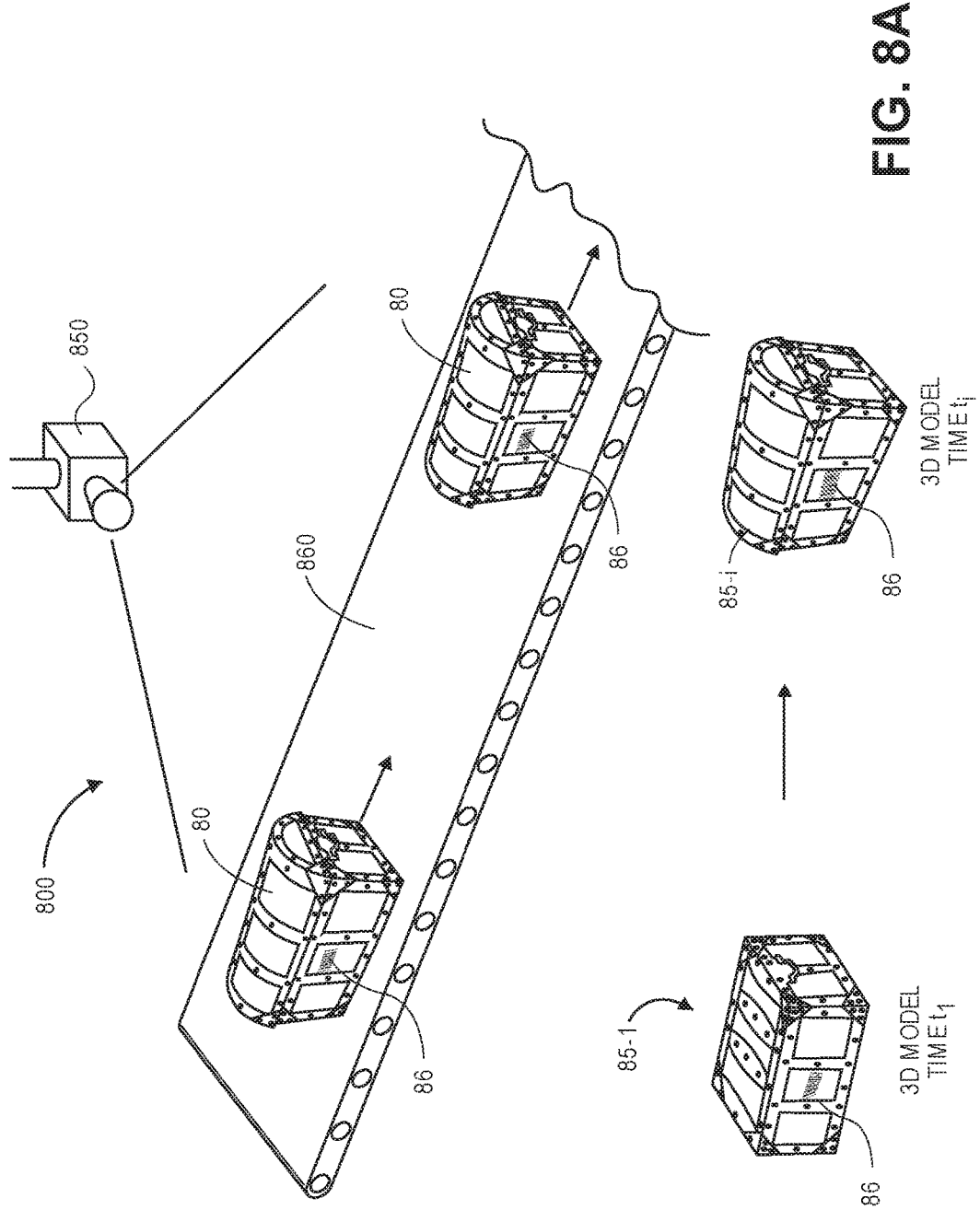
FIG. 8A through FIG. 8D are views of aspects of one system for generating textured three-dimensional models in accordance with embodiments of the present disclosure.

As is shown in FIG. 8A, the system 800 includes an imaging device 850 and a conveyor 860. An item 80 (viz., a tapered chest or locker) bearing a marked identifier 86 on one surface is positioned on the conveyor 860, and is traveling at an operating velocity $V_{CON}$ of the conveyor 860. As is also shown in FIG. 8A, an initial 3D model 85-1 of the item 80 may be generated based on imaging data captured from the item 80 using the imaging device 850 at time $t_1$. The 3D model 85-1 of the item 80 may be continuously refined using imaging data subsequently captured from the item 80 at times following time $t_1$, until a substantially accurate 3D model 85-$i$ of the item 80 is defined at time $t_i$, e.g., by reprojecting subsequently captured visual imaging data onto the 3D model 85-1, or by comparing the subsequently captured visual imaging data to one or more aspects of the 3D model 85-1.

Figure 8B:
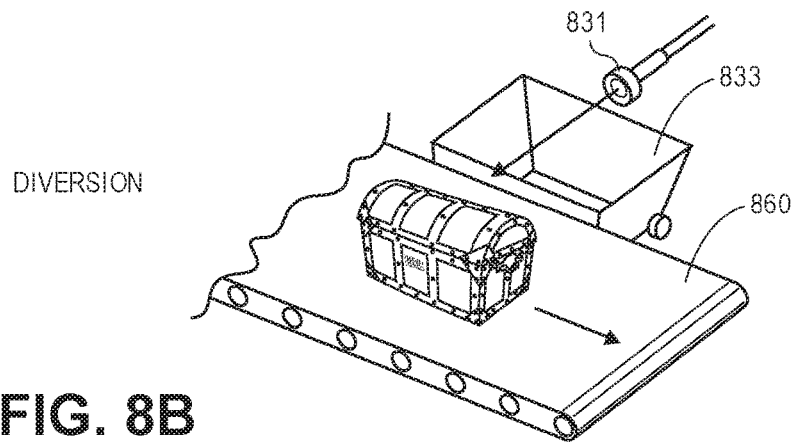

Once the substantially accurate 3D model 85-$i$ of the item 80 is defined, the 3D model 85-$i$ of the item 80 may be utilized to identify one or more surfaces of the item 80 that may be interacted with for any relevant purpose. For example, as is shown in FIG. 8B, a surface of the item 80 having sufficient flatness and size for accommodating a repositionable suction implement 831 may be identified from a 3D model, and the suction implement 831 may be applied to a corresponding surface of the item 80. Subsequently, the suction implement 831 may engage the item 80, withdraw the item 80 from the conveyor 860 and deposit the item 80 in a wheeled cart 833. Alternatively, a sufficiently large or flat surface may be selected for accommodating a pusher divert, or any other diversion system, other than the suction implement 831.

Figure 8C:
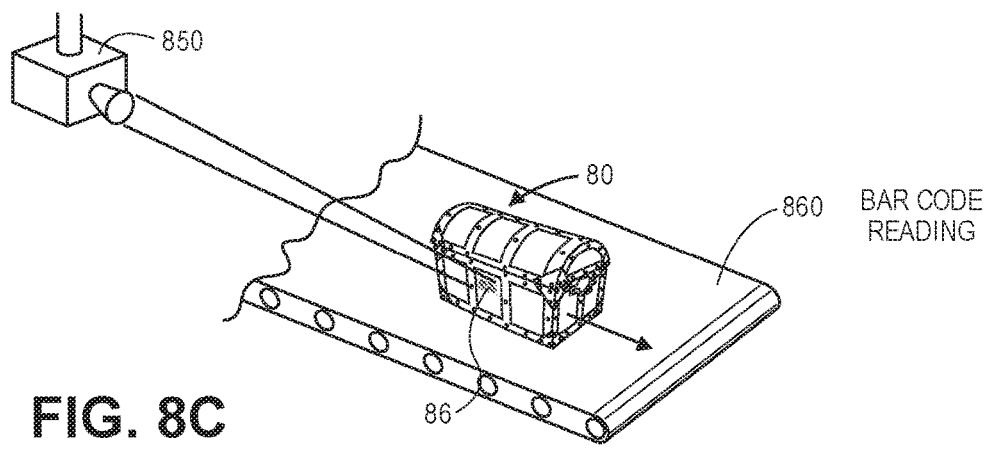
Figure 8D:
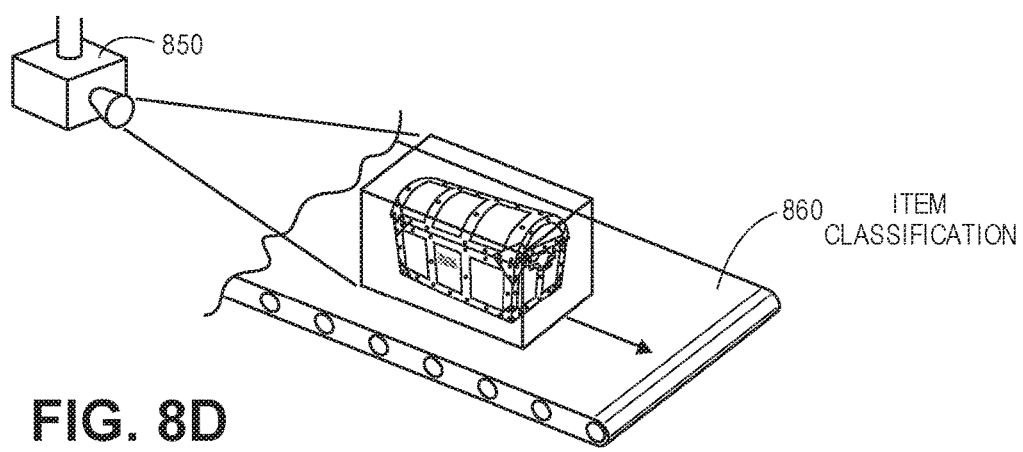

As is shown in FIG. 8C, a surface bearing the marked identifier 86 may be identified within the 3D model, and the imaging device 850 or another camera, scanner, sensor or other imaging device may be aligned to read and interpret the marked identifier 86. As is shown in FIG. 8D, one or more surfaces of the item 80 may be recognized and subject to evaluation using the imaging device 850 or another camera, scanner, sensor or other imaging device, in order to recognize and classify the item 80 according to one or more standards. Any physical, virtual or other interaction with surfaces of the item 80 may be effectuated more quickly and efficiently once an accurate 3D model of the item 80 is defined and refined accordingly.

The systems and methods of the present disclosure provide a number of advantages in the generation of models of objects that are in relative motion with respect to one or more imaging devices. For example, one or more of the embodiments disclosed herein may generate 3D models in a single stream, e.g., with surface meshes or point clouds having associated textures, rather than discrete depth maps or point clouds and separate color images. Such models may represent textural properties of objects in a best and fastest manner, reducing and simplifying processes for generating 3D models while improving structural, geometric and texture clarity and resolution.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments described herein or shown in the accompanying figures refer to the processing of texture data that is in color, e.g., defined according to an RGB color model, the systems and methods disclosed herein are not so limited, and may be used to process any type of information or data that is provided in color according to any color model, or in black-and-white or grayscale. In some embodiments, the systems and methods disclosed herein may be used in connection with three-channel, 24-bit visual imaging data and with depth imaging data. In other embodiments, however, visual imaging data having any number of channels or bits thereof may be used.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A conveying system comprising:
   a conveyor;
   an imaging device configured to capture visual imaging data and depth imaging data, wherein the imaging device includes at least a portion of the conveyor within a field of view thereof;
   at least one memory device; and
   at least one computer processor,
   wherein the at least one computer processor is configured to at least:
   cause the conveyor to operate at a first velocity with an item resting thereon;
   cause a first set of imaging data to be captured at a first time, wherein the first set of imaging data comprises first depth imaging data and first visual imaging data, and wherein the item is in a first position on the conveyor at the first time;
   generate a first point cloud for the item based at least in part on the first depth imaging data, wherein the first point cloud comprises a plurality of points in three-dimensional space;

map at least a portion of the first visual imaging data to the first point cloud;
generate a first three-dimensional model of the item in the first position based at least in part on the first point cloud and at least the mapped portion of the first visual imaging data;
cause a second set of imaging data to be captured at a second time, wherein the second set of imaging data comprises second visual imaging data, and wherein the item is in a second position on the conveyor at the second time;
generate a synthetic three-dimensional model of the item in the second position based at least in part on the first three-dimensional model and the first velocity;
map at least a portion of the second visual imaging data to the synthetic three-dimensional model;
determine at least one difference between the mapped portion of the second visual imaging data and the synthetic three-dimensional model of the item in the second position;
generate a second three-dimensional model of the item based at least in part on the first point cloud and the at least one difference between the mapped portion of the second visual imaging data and the synthetic three-dimensional model of the item in the second position; and
store the second three-dimensional model of the item in the at least one memory device.

2. The conveying system of claim 1, wherein the at least one computer processor is further configured to at least:
identify an element of the item in the second visual imaging data; and
identify the element of the item in the synthetic three-dimensional model,
wherein the at least one difference between the mapped portion of the second visual imaging data and the synthetic three-dimensional model of the item in the second position is a difference between a first position of the element of the item in the second visual imaging data and a second position of the element of the item in the synthetic three-dimensional model.

3. The conveying system of claim 1, wherein the at least one computer processor is further configured to at least:
determine coordinates of at least some of the points of the first point cloud;
determine a first distance, wherein the first distance is a product of the first velocity and a difference between the second time and the first time;
project the at least some of the points of the first point cloud forward along a direction of movement of the conveyor by the first distance; and
generate a second point cloud for the item based at least in part on the first depth imaging data, wherein the second point cloud comprises the at least some of the points of the first point cloud projected forward by the first distance.

4. The conveying system of claim 1, wherein the at least one computer processor is further configured to at least:
reposition a first point of the first point cloud;
add a second point to the first point cloud; or
remove a third point from the first point cloud,
wherein the second three-dimensional model of the item is generated based at least in part on the repositioning of the first point of the first point cloud, the addition of the second point to the first point cloud or the removal of the third point from the first point cloud.

5. The conveying system of claim 1, wherein the at least one computer processor is further configured to at least:
identify a first surface of the second three-dimensional model of the item, wherein the first surface of the second three-dimensional model corresponds to a second surface of the item;
execute an interaction with the second surface of the item, wherein the interaction is at least one of:
capturing an image of the second surface of the item;
applying a suction implement to the second surface of the item;
contacting a pusher divert with the second surface of the item; or
decoding a bar code on the second surface of the item.

6. A computer-implemented method comprising:
identifying a first set of imaging data captured from an object in a first position at a first time, and wherein the first set of imaging data comprises first visual imaging data representing at least a first texture of a surface of the object at the first time;
deriving a first model of the object from the first set of imaging data, wherein the first model of the object includes the first texture of the surface of the object at the first time;
identifying a second set of imaging data captured from the object in a second position at a second time, wherein the second set of imaging data comprises second visual imaging data representing at least a second texture of the surface of the object at the second time;
generating a projection of the first model to the second position, wherein the projection of the first model to the second position comprises a projection of the first texture of the surface of the object at the second time;
determining whether the second texture of the surface of the object at the second time is consistent with the projection of the first texture of the surface of the object at the second time;
upon determining that the second texture of the surface of the object at the second time is not consistent with the projection of the first texture of the surface of the object at the second time,
deriving a second model of the object based at least in part on the second texture of the surface of the object at the second time and the projection of the first model to the second position; and
storing the second model of the object in at least one data store.

7. The computer-implemented method of claim 6, wherein the first set of imaging data further comprises first depth imaging data, and
wherein deriving the first model of the object from the first set of imaging data comprises:
generating a first point cloud based at least in part on the first depth imaging data, wherein the first point cloud comprises a plurality of points corresponding to at least a portion of the surface of the object.

8. The computer-implemented method of claim 7, wherein deriving the first model of the object from the first set of imaging data further comprises:
mapping at least a portion of the first visual imaging data to the first point cloud.

9. The computer-implemented method of claim 8, wherein determining whether the second texture of the surface of the object at the second time is consistent with the projection of the first texture of the surface of the object at the second time comprises:

mapping at least a portion of the second visual imaging data to the projection of the first model to the second position.

10. The computer-implemented method of claim 9, wherein mapping at least the portion of the second visual imaging data to the projection of the first model to the second position comprises:
recognizing a representation of the portion of the surface of the object within the second visual imaging data; and
recognizing a representation of the portion of the surface of the object within the first visual imaging data, and
wherein deriving the second model of the object comprises at least one of:
adjusting a position of at least one of the plurality of points of the first point cloud;
adding a point to the plurality of points of the first point cloud; or
removing one of the plurality of points from the first point cloud,
wherein the second model is derived based at least in part on a difference between the representation of the portion of the surface of the object within the second visual imaging data and the representation of the portion of the surface of the object within the first visual imaging data.

11. The computer-implemented method of claim 7, wherein the object is in motion at a first velocity, and
wherein generating the projection of the first model in the second position comprises:
determining a first distance traveled by the object from the first time to the second time based at least in part on a product of the first velocity of the object and a time difference between the first time and the second time; and
generating a second point cloud based at least in part on the first depth imaging data and the first distance, wherein the second point cloud comprises the plurality of points of the first point cloud adjusted by the first distance,
wherein the projection of the first model in the second position comprises the second point cloud.

12. The computer-implemented method of claim 11, wherein the object is in motion at the first velocity on a conveyor, and
wherein at least a portion of the conveyor is within a field of view of a first imaging device.

13. The computer-implemented method of claim 12, further comprising:
recognizing at least one surface of the object within the second model; and
executing at least one interaction with the at least one surface of the object on the conveyor.

14. The computer-implemented method of claim 13, wherein the at least one interaction is at least one of:
removing the object from the conveyor by contact with the at least one surface of the object;
interpreting at least one marking on the at least one surface of the object; or
classifying the object based at least in part on the at least one surface of the object.

15. The computer-implemented method of claim 6, wherein identifying the first set of imaging data comprises:
capturing the first set of imaging data by a first imaging device, and
wherein identifying the second set of imaging data comprises:

capturing the second set of imaging data by the first imaging device.

16. The computer-implemented method of claim 6, further comprising:
identifying a third set of imaging data captured from the object in a third position at a third time, wherein the third set of imaging data comprises third imaging data representing at least a third texture of the surface of the object at the third time;
generating a projection of the second model to the third position, wherein the projection of the second model to the third position comprises a projection of the second texture of the surface of the object at the third time;
determining whether the third texture of the surface of the object at the third time is consistent with the projection of the second texture of the surface of the object at the third time;
upon determining that the third texture of the surface of the object at the third time is not consistent with the projection of the second texture of the surface of the object at the third time,
deriving a third model of the object based at least in part on the third texture of the surface of the object at the third time and the projection of the second model to the third position; and
storing the third model of the object in the at least one data store.

17. The computer-implemented method of claim 6,
upon determining that the second set of imaging data is consistent with the projection of the first model in the second position,
storing the first model of the object in the at least one data store.

18. An imaging system comprising:
a visual imaging sensor;
a depth imaging sensor;
at least one data store; and
at least one computer processor configured to at least:
capture, by the depth imaging sensor, first depth imaging data from an object in a first position;
capture, by the visual imaging sensor, first visual imaging data from the object in the first position;
define a first three-dimensional model of the object in the first position based at least in part on the first depth imaging data and the first visual imaging data;
determine a velocity of the object;
generate a second three-dimensional model of the object in a second position based at least in part on the first three-dimensional model of the object and the velocity of the object;
capture, by the visual imaging sensor, second visual imaging data from the object in the second position;
map at least some of the second visual imaging data onto the second three-dimensional model; and
generate a third three-dimensional model of the object in the second position based at least in part on the at least some of the second visual imaging data mapped onto the second three-dimensional model.

19. The imaging system of claim 18, wherein the at least one computer processor is further configured to at least:
derive a first texture of the object in the first position from the first visual imaging data;
derive a first point cloud representative of the object in the first position from the first depth imaging data; and
map the first texture to the first point cloud, wherein the first three-dimensional model of the object in the first position comprises the first texture mapped to the first point cloud.

20. The imaging system of claim 19, wherein the at least one computer processor is further configured to at least:
project the first three-dimensional model of the object to the second position, wherein the second three-dimensional model of the object is the first three-dimensional model of the object projected to the second position;
derive a second texture of the object in the second position from the second visual imaging data; and
map the second texture to the second three-dimensional model of the object,
wherein the third three-dimensional model of the object in the second position comprises the second texture mapped to the second three-dimensional model of the object.

* * * * *